United States Patent [19]
Bonner et al.

[11] Patent Number: 5,342,455
[45] Date of Patent: Aug. 30, 1994

[54] IN-SITU GENERATION OF HEAT TREATING ATMOSPHERES USING A MIXTURE OF NON-CRYOGENICALLY PRODUCED NITROGEN AND A HYDROCARBON GAS

[75] Inventors: Brian B. Bonner, Nesquehoning; Diwakar Garg, Macungie; Donald P. Eichelberger, Allentown; Donald J. Bowe, Macungie, all of Pa.

[73] Assignee: Air Products and Chemicals, Inc., Allentown, Pa.

[21] Appl. No.: 966,967

[22] Filed: Oct. 26, 1992

Related U.S. Application Data

[60] Division of Ser. No. 787,982, Nov. 5, 1991, Pat. No. 5,259,893, which is a continuation-in-part of Ser. No. 727,806, Jul. 8, 1991, Pat. No. 5,221,369.

[51] Int. Cl.$^5$ .............................................. C21D 1/00
[52] U.S. Cl. ........................................ 148/208; 148/210; 148/217; 148/231; 148/240; 148/703
[58] Field of Search ................ 148/208, 210, 217, 231, 148/240, 703

[56] References Cited

U.S. PATENT DOCUMENTS 4,386,972 6/1983 Knight ............................... 148/16
5,069,728 12/1991 Rancon et al. ....................... 266/81

FOREIGN PATENT DOCUMENTS 2076023 11/1981 United Kingdom ............... 148/16.5

*Primary Examiner*—Upendra Roy
*Attorney, Agent, or Firm*—James C. Simmons; William F. Marsh

[57] ABSTRACT

A process for generating in-situ low-cost atmospheres suitable for annealing and heat treating ferrous and non-ferrous metals and alloys, brazing metals, sealing glass to metals, and sintering metal and ceramic powders in a continuous furnace from non-cryogenically produced nitrogen containing up to 5% residual oxygen is presented. The disclosed process involves mixing nitrogen gas containing residual oxygen with a predetermined amount of a hydrocarbon gas, feeding the gaseous mixture through a nonconventional device into the hot zone of a continuous heat treating furnace, converting residual oxygen to an acceptable form such as a mixture of moisture and carbon dioxide, a mixture of moisture, hydrogen, carbon monoxide, and carbon dioxide, or a mixture of carbon monoxide, moisture, and hydrogen, and using the resultant gaseous mixture for annealing and heat treating metals and alloys, brazing metals, sintering metal and ceramic powders, and sealing glass to metals.

10 Claims, 8 Drawing Sheets

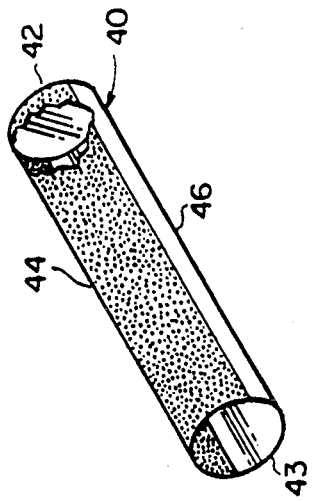
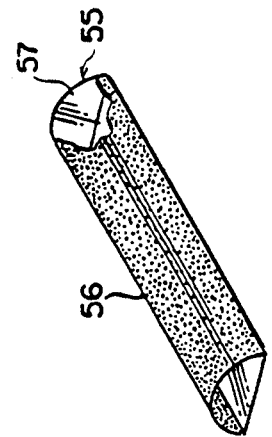
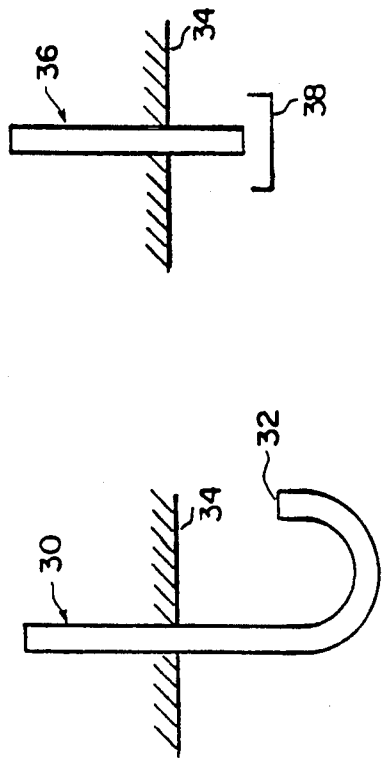
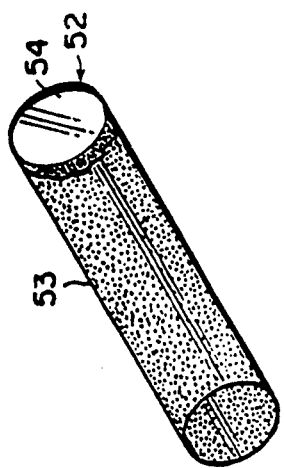

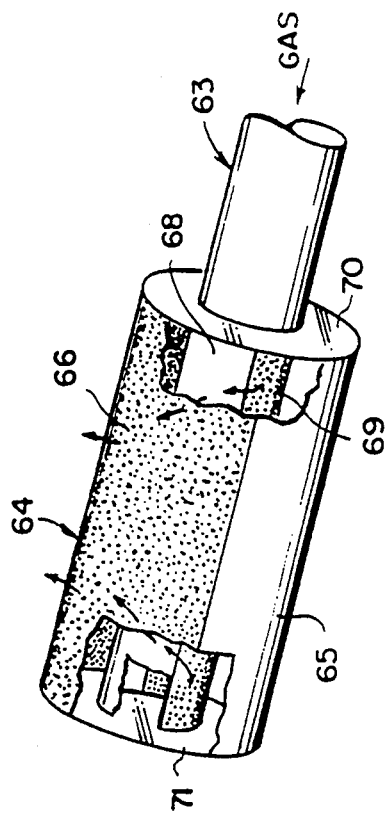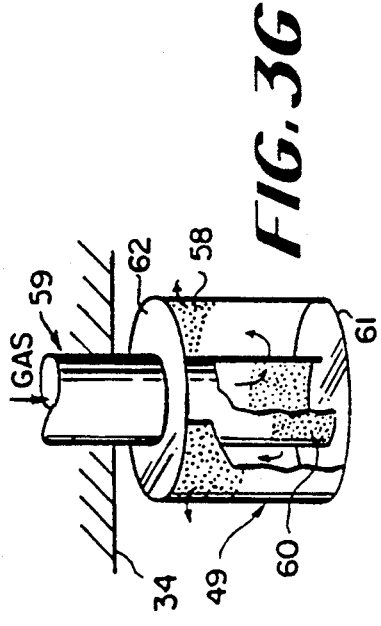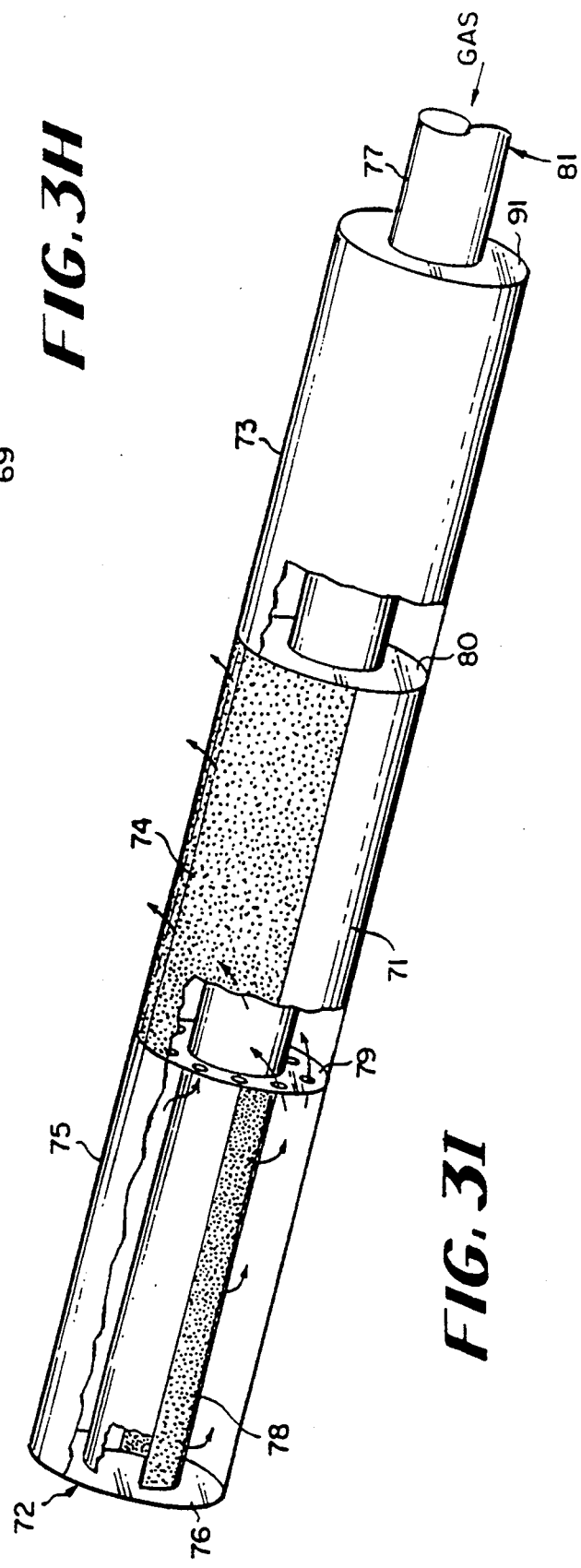

750 C TEMPERATURE PROFILE

950 C TEMPERATURE PROFILE

IN-SITU GENERATION OF HEAT TREATING ATMOSPHERES USING A MIXTURE OF NON-CRYOGENICALLY PRODUCED NITROGEN AND A HYDROCARBON GAS

This is a division of application Ser. No. 07/787,982, now U.S. Pat. No. 5,259,893 filed Nov. 5, 1991, which is a continuation-in-part of Ser. No. 07/727,806 filed Jul. 8, 1991, now U.S. Pat. No. 5,221,369.

FIELD OF THE INVENTION

The present invention pertains to preparing controlled furnace atmospheres for heat treating metals, alloys, ceramics, composite materials and the like.

BACKGROUND OF THE INVENTION

Nitrogen-based atmospheres have been routinely used by the heat treating industry both in batch and continuous furnaces since the mid seventies. Because of low dew point and virtual absence of carbon dioxide and oxygen, nitrogen-based atmospheres do not exhibit oxidizing and decarburizing properties and are therefore suitable for a variety of heat treating operations. More specifically, a mixture of nitrogen and hydrogen has been extensively used for annealing low to high carbon and alloy steels as well as annealing of non-ferrous metals and alloys such as copper and gold. A mixture of nitrogen and a hydrocarbon such as methane or propane has gained wide acceptance for neutral hardening and decarburization-free annealing of medium to high carbon steels. A mixture of nitrogen and methanol has been developed and used for carburizing of low to medium carbon steels. Finally, a mixture of nitrogen, hydrogen, and moisture has been used for brazing metals, sintering metal and ceramic powders, and sealing glass to metals.

A major portion of nitrogen used by the heat treating industry has been produced by distillation of air in large cryogenic plants. The cryogenically produced nitrogen is generally very pure and expensive. To reduce the cost of nitrogen, several non-cryogenic air separation techniques such as adsorption and permeation have been recently developed and introduced in the market. The non-cryogenically produced nitrogen costs less to produce, however it contains from 0.05 to 5% residual oxygen, making a direct substitution of cryogenically produced nitrogen with non-cryogenically produced nitrogen in continuous annealing and heat treating furnaces very difficult if not impossible for some applications. Several attempts have been made by researchers to substitute cryogenically produced nitrogen directly with that produced non-cryogenically but with limited success even with the use of an excess amount of a reducing gas. The problem has generally been related to severe surface oxidation of the heat treated parts both in the cooling and heating zones of the furnace, resulting in rusting, scaling, and unacceptable metallurgical properties. The use of non-cryogenically produced nitrogen has therefore been limited to applications where surface oxidation, rusting, and scaling can be tolerated. For example, non-cryogenically produced nitrogen has been successfully used in oxide annealing of carbon steel parts which are generally machined after heat treatment. Its use has, however, not been successful for bright annealing of finished carbon steel parts due to the formation of scale and rust.

In the parent patent application referred to above a process for generating low-cost atmospheres inside continuous furnaces suitable for annealing and heat treating ferrous and non-ferrous metals alloys using non-cryogenically produced nitrogen and a reducing gas such as hydrogen, a hydrocarbon, or a mixture thereof was disclosed. The parent application described in detail processes for generating heat treating atmospheres from non-cryogenically produced nitrogen and a reducing gas, particularly hydrogen.

SUMMARY OF THE INVENTION

The present invention pertains to processes for generating in-situ low cost atmospheres suitable for annealing and heat treating ferrous and non-ferrous metals and alloys, brazing metals, sintering metal and ceramic powders, and sealing glass to metals in continuous furnaces from non-cryogenically produced nitrogen. According to the processes, suitable atmospheres are generated by 1) mixing non-cryogenically produced nitrogen containing up to 5% residual oxygen with a hydrocarbon gas, 2) feeding the gas mixture into continuous furnaces having a hot zone operated at temperatures above between about 700° C. and about 1,250° C. in a defined way or step, and 3) converting the residual oxygen to an acceptable form such as a mixture of moisture and carbon dioxide, a mixture of moisture, hydrogen, carbon monoxide, and carbon dioxide, or a mixture of carbon monoxide, moisture, and hydrogen. The processes utilize the gas feeding device disclosed in the aforementioned application which device helps in converting residual oxygen present in the feed to an acceptable form prior to coming in contact with the parts to be heat treated. The gas feeding device can be embodied in many forms so long as it can be positioned for introduction of the atmosphere components into the furnace in a manner to promote conversion of the oxygen in the feed gas to an acceptable form prior to coming in contact with the parts. In some cases, the gas feeding device can be designed in a way that it not only helps in the conversion of oxygen in the feed gas to an acceptable form but also prevents the direct impingement of feed gas with unreacted oxygen on the parts.

BRIEF DESCRIPTION OF THE DRAWINGS

FIG. 3A is a schematic representation of an open tube device according to present invention for introducing atmosphere into a heat treating furnace.

FIG. 3B is a schematic representation of an open tube and baffle device according to present invention for introducing atmosphere into a heat treating furnace.

FIG. 3C is a schematic representation of a semi-porous device according to present invention for introducing atmosphere into a heat treating furnace.

FIG. 3D is a schematic representation of an alternate configuration of a semi-porous device according to present invention used to introduce atmosphere into a furnace.

FIG. 3E and 3F are schematic representations of other porous devices according to present invention for introducing atmosphere into a heat treating furnace.

FIG. 3G is a schematic representation of a concentric porous device inside a porous device according to present invention for introducing atmosphere into a heat treating furnace.

FIG. 3H and 3I are schematic representations of concentric porous devices according to present invention for introducing atmosphere into a heat treating furnace.

DETAILED DESCRIPTION OF THE INVENTION

The present invention relates to processes for generating low-cost atmospheres suitable for annealing and heat treating ferrous and non-ferrous metals and alloys in continuous furnaces using non-cryogenically produced nitrogen. The processes of the present invention are based on the surprising discovery that atmospheres suitable for annealing and heat treating ferrous and non-ferrous metals and alloys, brazing metals, sintering metal and ceramic powders, and sealing glass to metals can be generated inside a continuous furnace from non-cryogenically produced nitrogen by mixing it with a hydrocarbon gas in a predetermined proportion and feeding the mixture into the hot zone of the furnace through a non-conventional device that facilitates conversion of residual oxygen present in non-cryogenically produced nitrogen to an acceptable form prior to coming in contact with the parts and/or prevents the direct impingement of feed gas on the parts.

Nitrogen gas produced by cryogenic distillation of air has been widely employed in many annealing and heat treating applications. Cryogenically produced nitrogen is substantially free of oxygen (oxygen content has generally been less than 10 ppm) and very expensive. Therefore, there has been a great demand, especially by the heat treating industry, to generate nitrogen inexpensively for heat treating applications. With the advent of non-cryogenic technologies for air separation such as adsorption and permeation, it is now possible to produce nitrogen gas inexpensively. The non-cryogenically produced nitrogen, however, is contaminated with up to 5% residual oxygen, which is generally undesirable for many heat treating applications. The presence of residual oxygen has made the direct substitution of cryogenically produced nitrogen for that produced by non-cryogenic techniques very difficult.

Figure 1:
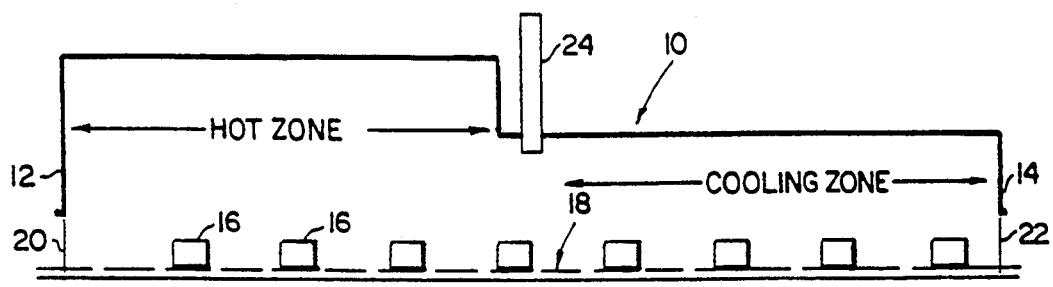
FIG. 1 is a schematic representation of a controlled atmosphere heat treating furnace illustrating atmosphere introduction into the transition or cooling zone of the furnace.

Several attempts to substitute cryogenically produced nitrogen for that produced non-cryogenically in continuous furnaces have met limited success even when using additions of excess amounts of hydrocarbon gas. The metallic parts treated with non-cryogenically produced nitrogen were always scaled, rusted, or oxidized. These problems are believed to be caused by the introduction of the gaseous feed mixture through an open tube in the transition (or shock) zone located between the heating and the cooling zones of continuous furnaces. The introduction of non-cryogenically produced nitrogen premixed with a hydrocarbon gas in the transition or cooling zone does not allow residual oxygen present in the feed gas to react with the reducing gas, resulting in oxidation of the parts in the cooling zone. This is a conventional way of introducing feed gas into continuous furnaces and is shown in FIG. 1 where 10 denotes the furnace having an entry end 12 and a discharge end 14. Parts 16 to be treated are moved through furnace 10 by means of an endless conveyor 18. Furnace 10 can be equipped with entry and exit curtains 20, 22 respectively to help maintain the furnace atmosphere, a technique known in the art. As shown in FIG. 1 an atmosphere is injected into the transition zone, located between the hot zone and the cooling zone by means of pipe or tube like device 24.

Figure 2:
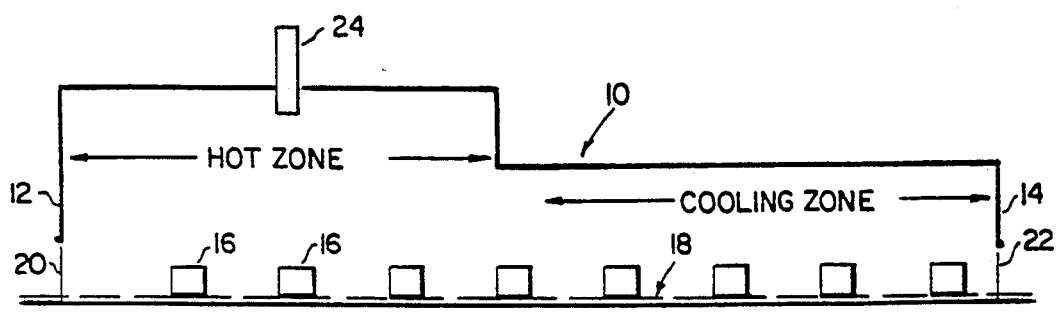
FIG. 2 is a schematic representation of a controlled atmosphere heat treating furnace illustrating atmosphere introduction into the hot zone of the furnace.

To improve the rate and extent of reaction between residual oxygen and a hydrocarbon gas, attempts have been made to introduce gaseous feed mixture directly into the hot zone of a continuous furnace 10 using a conventional open feed tube 24, as shown in FIG. 2. Parts treated by this method were found to be scaled, rusted or oxidized non-uniformly.

According to the present invention scaling, rusting, and non-uniform oxidation can be prevented by the process of feeding gaseous mixtures into the furnace in a specific manner so that the residual oxygen present in the feed gas is reacted with a hydrocarbon gas and converted to an acceptable form prior to coming in contact with the parts. This was accomplished by introducing the gaseous feed mixture into the hot zone of the furnace using devices which prevent the direct impingement of feed gas on the parts and/or to help in converting residual oxygen present in the gaseous feed mixture by reaction with a hydrocarbon gas to an acceptable form prior to coming in contact with the parts. Devices used to effect the processes of the present invention are shown in FIGS. 3A through 3I and discussed in detail in the specification of our copending application referred to above.

A continuous furnace operated at atmospheric or above atmospheric pressure with separate heating and cooling zones is most suitable for the processes of the present invention. The continuous furnace can be of the mesh belt, a roller hearth, a pusher tray, a walking beam, or a rotary hearth type.

A continuous furnace operated at atmospheric or above atmospheric pressure with a heating zone and an integrated quench cooling zone is also suitable for the processes of the present invention. The continuous furnaces can be a mesh belt, shaker, a roller hearth, a pusher tray, or a rotary hearth type.

The residual oxygen in non-cryogenically produced nitrogen can vary from 0.05% to about 5%. It can preferably vary from about 0.05% to about 3%. More preferably, it can vary from about 0.05% to about 1.0%.

The hydrocarbon gas can be selected from the group consisting of a hydrocarbon, an alcohol, an ether, or mixtures thereof. The hydrocarbon gas can be selected from alkanes such as methane, ethane, propane, and butane; alkenes such as ethylene, propylene, and butene; alcohols such as methanol, ethanol, and propanol; and ethers such as dimethyl ether, diethyl ether, and methyl-ethyl ether. Commercial feedstocks such as natural gas, petroleum gas, cooking gas, coke oven gas, town gas, exothermic gas, and endothermic gas can also be used as a reducing gas.

A hydrocarbon selected from alkanes, alkenes, ethers, alcohols, commercial feedstocks, and their mixtures can be used in the furnace operating at temperatures from about 700° C. to about 1,250° C., preferably used in the furnaces operating between 800° C. to about 1,250° C. The selection of the amount of a hydrocarbon gas depends upon the treatment temperature and the composition and reactivity of the hydrocarbon gas. For example, the amount of natural gas required for controlled oxide annealing of low to high carbon steel is between 1.0 and below about 5.0 times the stoichiometric amount at 1,100° C.; whereas, it is between 1.0 and below about 1.5 times the stoichiometric amount for propane at the same temperature. This is due to the fact that propane is more reactive with oxygen than natural gas (the auto-ignition temperature of propane is 450° C. versus 630° C. for natural gas). The term stoichiometric amount stands for the amount of hydrocarbon gas required for converting residual oxygen present in the non-cryogenically produced nitrogen to a mixture of moisture and carbon dioxide. The amount of a hydrocarbon gas required for oxide annealing increases with a decrease in the temperature. For example, the amount of natural gas required at 1,050° C. is between 1.0 and below about 6.0 times the stoichiometric amount. The amount of propane required for oxide annealing at 1,050° C. is between 1.0 and below about 1.7 times the stoichiometric amount. Likewise, the amount of natural gas required at 1,000° C., 950° C., and 850° C. is greater than 1.0 times but below about 10.0, 24.0, and 40.0 times the stoichiometric amount, respectively. Similarly, the about of propane at 1,000° C. and 950° C. is greater than 1.0 times but below about 1.9 and 3.2 times the stoichiometric amount, respectively.

The bright, oxide-free and partially decarburized annealing of low to high carbon steel is carried out at temperatures between about 800° C. and 1,250° C. The amount of a hydrocarbon gas required for producing atmospheres suitable for bright, oxide-free, and partially decarburized annealing of low to high carbon steel depends upon the furnace temperature and the reactivity of the hydrocarbon used. For example, the amount of natural gas required is above about 5.0 times the stoichiometric amount at 1,100° C.; whereas, it is above about 1.5 times the stoichiometric amount for propane at the same temperature. The amount of a hydrocarbon gas required for bright annealing increases with a decrease in the temperature. For example, the amount of natural gas required at 1,050° C. is above about 6.0 times the stoichiometric amount. The amount of propane required at 1,050° C. is above about 1.7 times the stoichiometric amount. Likewise, the amount of natural gas required at 1,000° C., 950° C., and 850° C. is above about 10.0, 24.0, and 40.0 times the stoichiometric amount, respectively. Similarly, the amount of propane at 1,000° C. and 950° C. is above about 1.9 and 3.2 times the stoichiometric amount, respectively.

The bright, oxide-free and partially decarburized, oxide-free and decarburized-free, or oxide-free and partially carburized annealing of low to high carbon steel annealing of low to high carbon steel is also carried out at temperatures between about 800° C. and 1,250° C. The amount of a hydrocarbon gas required for producing atmosphere suitable for bright, oxide-free and partially decarburized, oxide-free and decarburized-free, or oxide-free and partially carburized annealing of low to high carbon steel also depends upon the furnace temperature and the reactivity of the hydrocarbon used. For example, the amount of natural gas required is above about 5.0 times the stoichiometric amount at 1,100° C.; whereas, it is above about 1.5 times the stoichiometric amount for propane at the same temperature. The amount of a hydrocarbon gas required also increases with a decrease in the temperature. For example, the amount of natural gas required at 1,050° C. is above about 6.0 times the stoichiometric amount. The amount of propane required at 1,050° C. is above about 1.7 times the stoichiometric amount. Likewise, the amount of natural gas required at 1,000° C., 950° C., and 850° C. is above about 10.0, 24.0, and 40.0 times the stoichiometric amount, respectively. Similarly, the amount of propane at 1,000° C. and 950° C. is above about 1.9 and 3.2 times the stoichiometric amount, respectively.

The brazing of metals, sealing of glass to metals, sintering of metal and ceramic powders, or annealing of non-ferrous alloys is carried out at temperatures between about 800° C. and 1,250° C. The amount of a hydrocarbon gas required for these operations depends upon the furnace temperature and the reactivity of the hydrocarbon used. For example, the amount of natural gas required is above about 5.0 times the stoichiometric amount at 1,100° C.; whereas, it is above about 1.5 times the stoichiometric amount for propane at the same temperature. The amount of a hydrocarbon gas required for these operations increases with a decrease in the temperature. For example, the amount of natural gas required at 1,050° C. is above 6.0 times the stoichiometric amount. The amount of propane required at 1,050° C. is above about 1.7 times the stoichiometric amount. Likewise, the amount of natural gas required at 1,000° C., 950° C., and 850° C. is above about 10.0, 24.0, and 40.0 times the stoichiometric amount, respectively. Similarly, the amount of propane at 1,000° C. and 950° C. is above about 1.9 and 3.2 times the stoichiometric amount, respectively.

The non-cryogenically produced nitrogen or the mixture of non-cryogenically produced nitrogen and hydrocarbon gaseous feed can optionally be preheated close to the heat treatment temperature prior to introducing it into the furnace. Preheating the nitrogen or the nitrogen and hydrocarbon gas mixture would tend to lower the minimum temperature required and the amount of hydrocarbon required for annealing ferrous and non-ferrous metals and alloys, brazing metals, sintering metal and ceramic powders, and sealing glass to metals according to the processes of the invention. The gaseous feed can be preheated using an external heater or within the furnace by passing it through a heating tube placed inside the furnace.

A small amount of hydrogen can optionally be added to the mixture of non-cryogenically produced nitrogen and hydrocarbon gas prior to introducing the gaseous feed into the hot zone of the furnace to further expand the operating window for annealing ferrous and non-ferrous metals and alloys, brazing metals, sintering metal and ceramic powders, and sealing glass to metals. The amount of hydrogen added can vary from about 0.1 times to about 5.0 times the stoichiometric amount required for converting residual oxygen present in the non-cryogenically produced nitrogen to moisture. The hydrogen gas can be supplied from gas or liquid hydrogen tanks. Optionally, it can be produced and supplied on-site by dissociating ammonia to a mixture of hydrogen and nitrogen.

Low and high carbon or alloy steels that can be heat treated according to the present invention can be selected from the groups 10XX, 11XX, 12XX, 13XX, 15XX, 40XX, 41XX, 43XX, 44XX, 46XX, 47XX, 48XX, 50XX, 51XX, 61XX, 81XX, 86XX, 87XX, 88XX, 92XX, 93XX, 50XXX, 51XXX, or 52XXX as described in Metals Handbook, Ninth Edition, Volume 4 Heat Treating, published by American Society for Metals. Tool steels selected from the groups AX, DX, OX, MX, or SX, iron nickel based alloys such as Incoloy, nickel alloys such as Inconel and Hastalloy, nickel-copper alloys such as Monel, cobalt based alloys such as Haynes and stellite can be heat treated according to processes disclosed in this invention.

Figure 5:
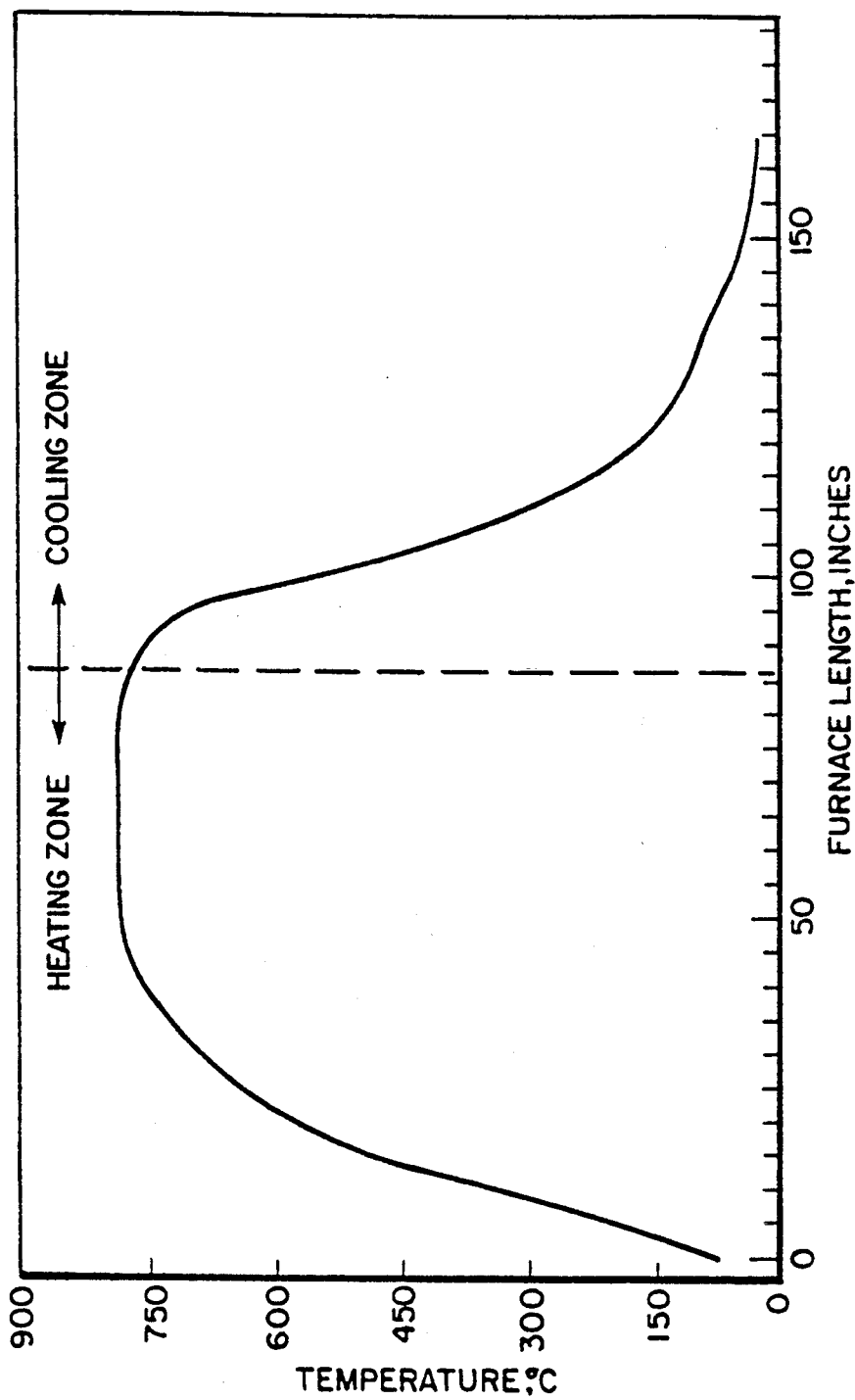
FIG. 5 is a plot of temperature against length of the furnace illustrating the experimental furnace profile for a heat treating temperature of 750° C.
Figure 6:
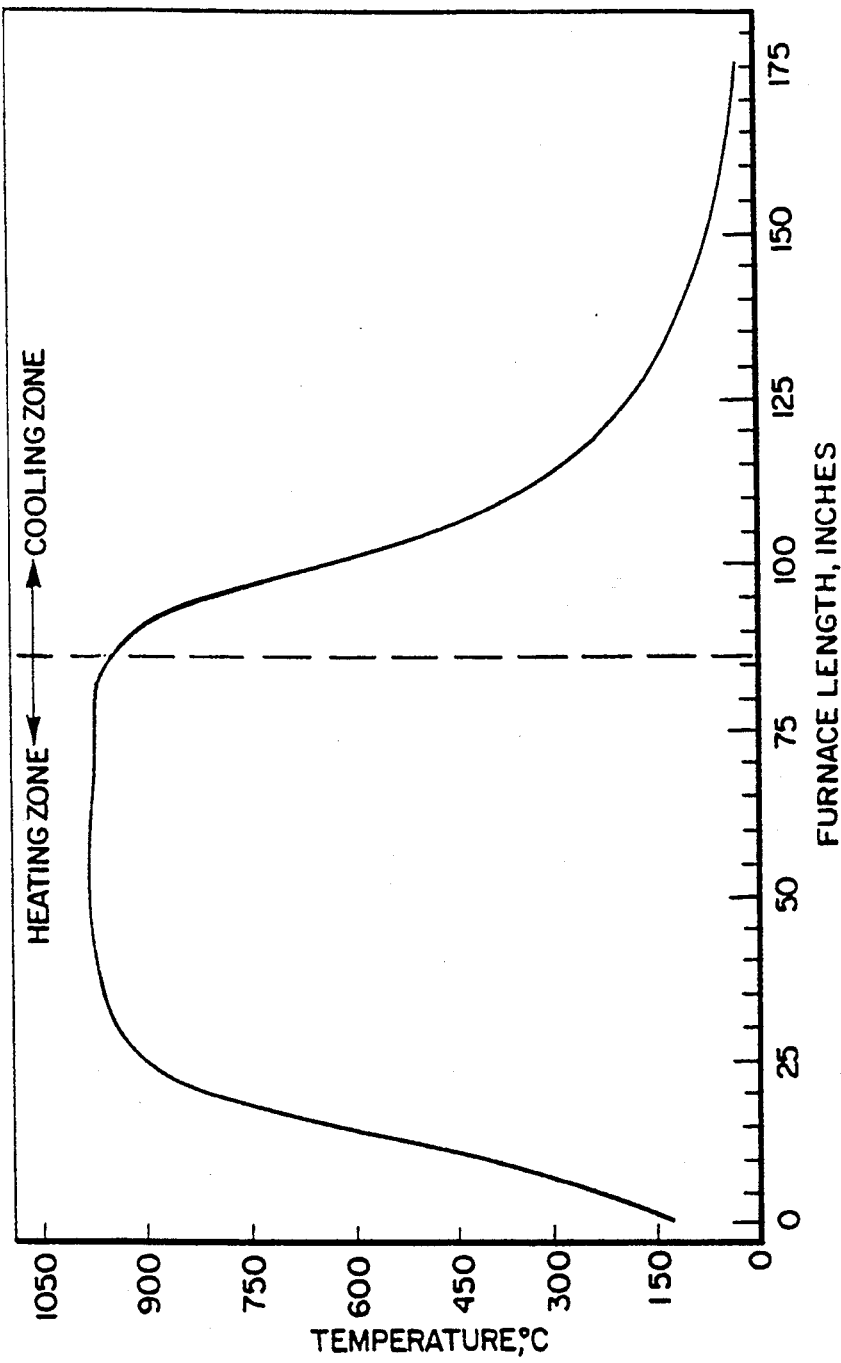
FIG. 6 is a plot similar to that of FIG. 5 for a heat treating temperature of 950° C.

In order to demonstrate the invention a series of annealing and heat treating tests were carried out in a Watkins-Johnson conveyor belt furnace capable of operating up to a temperature of 1,150° C. The heating zone of the furnace consisted of 8.75 inches wide, about 4.9 inches high, and 86 inches long Inconel 601 muffle heated resistively from the outside. The cooling zone, made of stainless steel, was 8.75 inches wide, 3.5 inches high, and 90 inches long and was water cooled from the outside. An 8.25 inches wide flexible conveyor belt supported on the floor of the furnace was used to feed the samples to be heat treated through the heating and cooling zones of the furnace. A fixed belt speed of about 6 inches per minute was used in all the experiments. The furnace shown schematically as 60 in FIG. 4 was equipped with physical curtains 62 and 64 both on entry 66 and exit 68 sections to prevent air from entering the furnace. The gaseous feed mixture containing non-cryogenically produced nitrogen premixed with a hydrocarbon base, was introduced into the transition zone via an open tube introduction device 70 or through one of the introduction devices 72, 74, 76 placed at different locations in the heating or hot zone of the furnace 60. Introduction devices 72, 74, 76 can be any one of the types shown in FIGS. 3A through 3I of the drawing. These hot zone feed locations 72, 74, 76 were located 12 inches, 30 inches, and 40 inches, respectively from the transition zone and they were located well into the hottest section of the hot zone as shown by the furnace temperature profiles depicted in FIGS. 5 and 6 obtained for 750° C. and 950° C. normal furnace operating temperatures with 350 SCFH of pure nitrogen flowing into furnace 60. The temperature profiles show a rapid cooling of the parts as they move out of the heating zone and enter the cooling zone. Rapid cooling of the parts is commonly used in annealing and heat treating to help in preventing oxidation of the parts from high levels of moisture and carbon dioxide often present in the cooling zone of the furnace. The tendency for oxidation is more likely in the furnace cooling zone since a higher $pH_2/pH_2O$, and $pCO/pCO_2$ are needed at lower temperatures where $H_2$ and CO are less reducing and $CO_2$ and $H_2O$ are more oxidizing.

Figure 4:
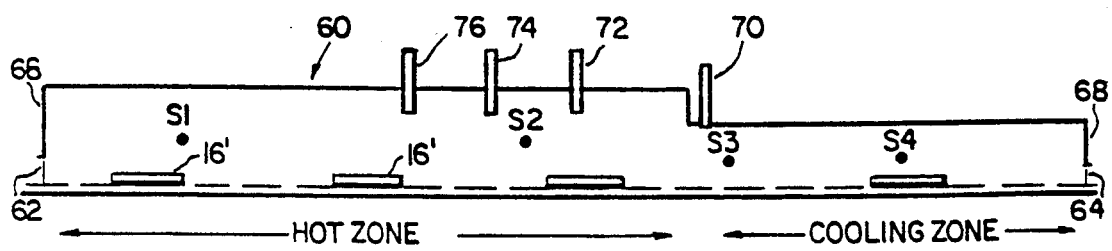
FIG. 4 is a schematic representation of a furnace used to test the heat treating processes according to the present invention.

A heat treating temperature between 750° C. to 1,100° C. was selected and used for heat treating 0.2 inch thick flat low-carbon steel specimens approximately 8 inches long by 2 inches wide. As shown in FIG. 4, the atmosphere composition present in the heating zone of the furnace 60 was determined by taking samples at locations designated S1 and S2 and samples were taken at locations S3 and S4 to determine atmosphere composition in the cooling zone. The samples were analyzed for residual oxygen, moisture (dew point), hydrogen, hydrocarbon, CO, and $CO_2$.

Several experiments were carried out to study annealing of carbon steel using non-cryogenically produced nitrogen premixed with natural gas containing predominantly methane at temperatures varying 750° C. to 1,100° C. The feed gas was introduced in the transition zone or the heating zone through a straight open-ended tube simulating the conventional method of introducing gas into the furnace. The results of these experiments are set out in Table 1.

TABLE 1

|  | Example 1-1 | Example 1-2 | Example 1-3 | Example 1-4 | Example 1-5 | Example 1-6A |
|---|---|---|---|---|---|---|
| Heat Treatment Temperature, °C. | 1,100 | 1,100 | 1,100 | 1,100 | 1,100 | 950 |
| Flow Rate of Feed Gas, SCFH | 350 | 350 | 350 | 350 | 350 | 350 |
| Feed Gas Location | Transition Zone | Transition Zone | Transition Zone | Transition Zone | Transition Zone | Transition Zone |
| Type of Feed Device | Open Tube | Open Tube | Open Tube | Open Tube | Open Tube | Open Tube |
| Feed Gas Composition |  |  |  |  |  |  |
| Nitrogen, % | 99.50 | 99.50 | 99.50 | 99.50 | 99.50 | 99.50 |
| Oxygen, % | 0.50 | 0.50 | 0.50 | 0.50 | 0.50 | 0.50 |
| Natural Gas* (Methane), % | 0.25 | 0.50 | 1.00 | 2.00 | 3.00 | 0.25 |
| Heating Zone Atmosphere Composition |  |  |  |  |  |  |
| Oxygen, ppm | <2 | <2 | <5 | <2 | <4 | <7 |
| Carbon Monoxide, % | — | 0.50 | 1.00 | 0.95 | 1.00 | 0.00 |
| Carbon Dioxide, % | — | 0.01 | 0.00 | 0.00 | 0.00 | 0.19 |
| Hydrogen, % | — | 1.30 | 1.50 | 3.00 | >5.00 | 0.25 |
| Methane, % | 0.03 | 0.11 | 0.23 | 0.42 | 0.53 | 0.03 |
| Dew Point, °C. | — | −31.0 | −31.5 | −33.9 | −44.0 | −2.9 |
| Cooling Zone Atmosphere Composition |  |  |  |  |  |  |
| Oxygen, ppm | 5,000 | 5,000 | 5,000 | 4,500 | 4,100 | 4,900 |
| Carbon Monoxide, % | 0.00 | 0.00 | 0.00 | 0.00 | 0.00 | 0.00 |
| Carbon Dioxide, % | 0.00 | 0.00 | 0.01 | 0.02 | 0.04 | 0.00 |
| Hydrogen, % | 0.00 | 0.00 | 0.05 | 0.15 | 0.20 | 0.00 |
| Methane, % | 0.25 | 0.50 | 0.98 | 1.92 | 2.96 | 0.24 |
| Dew Point, °C. | −34.0 | −31.4 | −27.8 | −21.4 | −20.1 | −29.0 |
| Quality of Heat Treated Samples | Non-Uniform Oxide | Non-Uniform Oxide | Non-Uniform Oxide | Non-Uniform Oxide | Non-Uniform Oxide | Uniform, Tightly Packed Oxide |

|  | Example 1-6B | Example 1-6C | Example 1-7 | Example 1-8 | Example 1-9A | Example 1-9B |
|---|---|---|---|---|---|---|
| Heat Treatment Temperature, °C. | 950 | 950 | 950 | 950 | 850 | 850 |
| Flow Rate of Feed Gas, SCFH | 350 | 350 | 350 | 350 | 350 | 350 |
| Feed Gas Location | Transition | Transition | Transition | Transition | Transition | Transition |

TABLE 1-continued

| Type of Feed Device | Zone Open Tube | Zone Open Tube | Zone Open Tube | Zone Open Tube | Zone Open Tube | Zone Open Tube |
|---|---|---|---|---|---|---|
| Feed Gas Composition | | | | | | |
| Nitrogen, % | 99.50 | 99.50 | 99.50 | 99.50 | 99.50 | 99.50 |
| Oxygen, % | 0.50 | 0.50 | 0.50 | 0.50 | 0.50 | 0.50 |
| Natural Gas* (Methane), % | 0.50 | 1.00 | 2.00 | 3.00 | 0.35 | 0.50 |
| Heating Zone Atmosphere Composition | | | | | | |
| Oxygen, ppm | <6 | <6 | <3 | <4 | 18 | 14 |
| Carbon Monoxide, % | 0.05 | 0.25 | 0.90 | — | 0.25 | 0.25 |
| Carbon Dioxide, % | 0.12 | 0.09 | 0.00 | 0.00 | 0.11 | 0.10 |
| Hydrogen, % | 0.20 | 0.50 | 2.90 | >5.00 | 0.30 | 0.35 |
| Methane, % | 0.25 | 0.64 | 1.10 | 1.40 | 0.07 | 0.20 |
| Dew Point, °C | 1.2 | — | −29.3 | −34.0 | −9.3 | −10.0 |
| Cooling Zone Atmosphere Composition | | | | | | |
| Oxygen, ppm | 4,900 | 4,800 | 4,300 | 4,000 | 4,800 | 4,800 |
| Carbon Monoxide, % | 0.00 | 0.00 | 0.00 | 0.00 | 0.00 | 0.00 |
| Carbon Dioxide, % | 0.00 | 0.00 | 0.01 | 0.01 | 0.01 | 0.02 |
| Hydrogen, % | 0.05 | 0.10 | 0.15 | 0.20 | 0.10 | 0.10 |
| Methane, % | 0.48 | 0.98 | 1.96 | 2.96 | 0.36 | 0.50 |
| Dew Point, °C | — | −27.0 | −18.0 | −19.0 | −33.1 | −29.3 |
| Quality of Heat Treated Samples | Uniform, Tightly Packed Oxide | Uniform, Tightly Packed Oxide | Non-Uniform Oxide | Non-Uniform Oxide | Uniform, Tightly Packed Oxide | Uniform, Tightly Packed Oxide |

| | Example 1-9C | Example 1-9D | Example 1-10A | Example 1-10B | Example 1-10C |
|---|---|---|---|---|---|
| Heat Treatment Temperature, °C | 850 | 850 | 750 | 750 | 750 |
| Flow Rate of Feed Gas, SCFH | 350 | 350 | 350 | 350 | 350 |
| Feed Gas Location | Transition Zone | Transition Zone | Transition Zone | Transition Zone | Transition Zone |
| Type of Feed Device | Open Tube | Open Tube | Open Tube | Open Tube | Open Tube |
| Feed Gas Composition | | | | | |
| Nitrogen, % | 99.50 | 99.50 | 99.50 | 99.50 | 99.50 |
| Oxygen, % | 0.50 | 0.50 | 0.50 | 0.50 | 0.50 |
| Natural Gas* (Methane), % | 1.00 | 2.00 | 0.25 | 0.50 | 1.00 |
| Heating Zone Atmosphere Composition | | | | | |
| Oxygen, ppm | <10 | <6 | 1,300 | 600 | 55 |
| Carbon Monoxide, % | 0.50 | 0.85 | 0.00 | 0.00 | 0.10 |
| Carbon Dioxide, % | 0.06 | 0.03 | 0.11 | 0.15 | 0.15 |
| Hydrogen, % | 1.00 | 2.30 | 0.10 | 0.20 | 0.40 |
| Methane, % | 0.51 | 1.10 | 0.16 | 0.37 | 0.77 |
| Dew Point, °C | −12.0 | −18.4 | −13.3 | −7.6 | −4.1 |
| Cooling Zone Atmosphere Composition | | | | | |
| Oxygen, ppm | 4,500 | 4,300 | 4,800 | 4,600 | 4,400 |
| Carbon Monoxide, % | 0.00 | 0.00 | 0.00 | 0.00 | 0.00 |
| Carbon Dioxide, % | 0.02 | 0.03 | 0.01 | 0.01 | 0.02 |
| Hydrogen, % | 0.40 | 0.50 | 0.10 | 0.15 | 0.30 |
| Methane, % | 1.00 | 1.96 | 0.24 | 0.48 | 0.97 |
| Dew Point, °C | −24.6 | −22.3 | −40.1 | −34.3 | −32.1 |
| Quality of Heat Treated Samples | Uniform, Tightly Packed Oxide | Uniform, Tightly Packed Oxide | Uniform, Tightly Packed Oxide | Uniform Tightly Packed Oxide | Uniform, Tightly Packed Oxide |

| | Example 1-10D | Example 1-11 | Example 1-12 | Example 1-13 | Example 1-14 | Example 1-18 |
|---|---|---|---|---|---|---|
| Heat Treatment Temperature, °C | 750 | 1,100 | 1,100 | 1,100 | 1,100 | 950 |
| Flow Rate of Feed Gas, SCFH | 350 | 350 | 350 | 350 | 350 | 350 |
| Feed Gas Location | Transition Zone | Heating Zone (Location 74) | Heating Zone (Location 74) | Heating Zone (Location 74) | Heating Zone (Location 74) | Heating Zone (Location 76) |
| Type of Feed Device | Open Tube | Open Tube | Open Tube | Open Tube | Open Tube | Open Tube |
| Feed Gas Composition | | | | | | |
| Nitrogen, % | 99.50 | 99.50 | 99.50 | 99.50 | 99.50 | 99.50 |
| Oxygen, % | 0.50 | 0.50 | 0.50 | 0.50 | 0.50 | 0.50 |
| Natural Gas* (Methane), % | 2.00 | 0.25 | 0.50 | 1.00 | 3.00 | 0.25 |
| Heating Zone Atmosphere Composition | | | | | | |
| Oxygen, ppm | 18 | <7 | <5 | <7 | <5 | <3 |
| Carbon Monoxide, % | 0.35 | — | 0.50 | 0.90 | 1.00 | 0.15 |
| Carbon Dioxide, % | 0.10 | 0.20 | 0.06 | 0.00 | 0.00 | 0.12 |
| Hydrogen, % | 0.15 | — | 0.70 | 1.70 | >5.0 | 0.30 |
| Methane, % | 1.58 | 0.03 | 0.08 | 0.17 | 0.34 | 0.01 |
| Dew Point, °C | −9.1 | +2.0 | −9.4 | −25.4 | −26.0 | −8.3 |
| Cooling Zone Atmosphere Composition | | | | | | |
| Oxygen, ppm | 4,100 | 700 | 64 | 55 | 30 | <4 |
| Carbon Monoxide, % | 0.00 | 0.00 | 0.15 | 0.40 | 1.00 | 0.10 |
| Carbon Dioxide, % | 0.04 | 0.20 | 0.12 | 0.06 | 0.01 | 0.18 |
| Hydrogen, % | 0.65 | 0.00 | 0.30 | 1.00 | ~5.00 | 0.25 |
| Methane, % | 1.95 | 0.03 | 0.09 | 0.48 | 1.90 | 0.02 |
| Dew Point, °C | −27.5 | 7.1 | 9.4 | 5.2 | −23.8 | −3.1 |
| Quality of Heat Treated Samples | Uniform, Tightly | Non-Uniform Oxide | Non-Uniform Oxide | Non-Uniform Oxide | Mixture of Bright and | Non-Uniform Oxide |

TABLE 1-continued

| Packed Oxide | Oxide |
| --- | --- |

*Natural gas was mixed with nitrogen and added as a percent of total non-cryogenically produced nitrogen.

The following summary of the data presented in Table 1 illustrates one aspect of the invention.

EXAMPLE 1-1

Samples of carbon steels described earlier were annealed at 1,100° C. in the Watkins-Johnson furnace using 350 SCFH of nitrogen containing 99.5% $N_2$ and 0.5% $O_2$. The gaseous feed nitrogen was similar in composition to that commonly produced by non-cryogenic air separation techniques. It was mixed with 0.25% natural gas consisting of predominately methane. This amount of natural gas was equal to the stoichiometric amount required for the complete conversion of residual oxygen present in the feed nitrogen completely to a mixture of carbon dioxide and moisture. The gaseous feed mixture was introduced into the furnace through a ¾ in. diameter tube located in the transition zone (location 70 in FIG. 4) of the furnace as is conventionally practiced in the heat treating industry. A part of the gaseous feed mixture traveled from the transition zone into the heating zone and exited through the entry curtain 62. This part of the feed mixture had an opportunity to heat up and cause natural gas and residual oxygen to react. The remaining feed gas traveled through the cooling zone and exited through the exit curtain 64. This part of the feed gas had no opportunity to heat up and cause residual oxygen to react with the natural gas. The gaseous feed mixture was passed through the furnace for at least one hour to purge and condition the furnace prior to heat treating the samples.

The steel samples heat treated in this example were found to be oxidized non-uniformly. The residual oxygen present in the portion of the feed gas travelling through the heating zone was reacted with natural gas and converted to a mixture of carbon dioxide and moisture. The surface of the samples were oxidized non-uniformly in the cooling zone due to the presence of a large amount of residual oxygen (see Table 1). It is believed the non-uniform oxidation was due to uncontrolled oxidation at high temperature in the heating zone and/or high cooling rate in the cooling zone.

Thus the introduction of non-cryogenically produced nitrogen pre-mixed with a stoichiometric amount of natural gas into a continuous heat treating furnace through an open tube located in the transition zone would result in an unacceptable process for oxide annealing or bright annealing steel at 1,100° C.

EXAMPLE 1-2

The carbon steel annealing experiment described in Example 1-1 was repeated using the same furnace, temperature, samples, location of feed gas, nature of feed gas device, flow rate and composition of feed gas, and annealing procedure with the exception of adding 0.50% natural gas to the feed gas with the amount of natural gas being 2.0 times stoichiometric amount required for converting residual oxygen present in the feed nitrogen to a mixture of carbon dioxide and moisture.

Steel samples heat treated in accord with this procedure were found to be oxidized non-uniformly. The presence of high $pCO/pCO_2$ (>2.8) and $pH_2/pH_2O$ (>1.3) ratios in the heating zone probably caused the surface of the samples to reduce in the heating zone (see Table 1), but the samples oxidized non-uniformly in the cooling zone due to presence of large amount of residual oxygen. Thus the introduction of non-cryogenically produced nitrogen pre-mixed with two times the stoichiometric amount of natural gas into a continuous heat treating furnace through an open tube located in the transition zone would result in an unacceptable process for oxide annealing or bright annealing steel at 1,100° C.

EXAMPLES 1-3 TO 1-5

The carbon steel annealing experiment described in Example 1-2 was repeated three times using the same furnace, temperature, samples, location of feed gas, nature of feed gas device, flow rate and composition of feed gas, and annealing procedure with the exception of adding 1.0, 2.0, and 3.0% natural gas to the feed gas with the amount of natural gas being 4.0, 8.0, and 12.0 times stoichiometric amount, respectively, required for converting residual oxygen present in the feed nitrogen to a mixture of carbon dioxide and moisture.

Steel samples heat treated in accord with these procedures were found to be oxidized non-uniformly. Thus the introduction of non-cryogenically produced nitrogen pre-mixed with 4.0, 8.0, and 12.0 times the stoichiometric amount of natural gas into a continuous heat treating furnace through an open tube located in the transition zone would result in an unacceptable process for oxide annealing or bright annealing steel at 1,100° C.

EXAMPLE 1-6A

The carbon steel annealing experiment described in Example 1-1 was repeated using the same furnace, samples, location of feed gas, nature of feed gas device, flow rate and composition of feed gas, and annealing procedure with the exception of using 950° C. temperature. The amount of natural gas added in this example was equal to the stoichiometric amount required for converting residual oxygen present in the feed nitrogen to a mixture of carbon dioxide and moisture.

Steel samples heat treated in accord with this procedure were found to have a uniform, tightly packed oxide layer on the surface. The residual oxygen present in the feed nitrogen was converted in the heating zone to a mixture of carbon dioxide and moisture. The presence of low $pCO/pCO_2$ (<2.4) and $pH_2/pH_2O$ (<1.6) ratios probably oxidized the surface of the samples in the heating zone. The surface of the samples was oxidized further in the cooling zone due to the presence of large amount of residual oxygen (see Table 1), resulting in uniform and controlled oxidation of the surface of the samples.

Thus the introduction of non-cryogenically produced nitrogen pre-mixed with stoichiometric amount of natural gas into a continuous heat treating furnace through an open tube located in the transition zone would result in an acceptable process for oxide annealing steel at 950° C. However, it would not result in an acceptable process for bright annealing steel at 950° C.

EXAMPLE 1-6B

The carbon steel annealing experiment described in Example 1-6A was repeated using the same furnace, temperature, samples, location of feed gas, nature of feed gas device, flow rate and composition of feed gas, and annealing procedure with the exception of adding 0.50% natural gas to the feed gas with the amount of natural gas being 2.0 times stoichiometric amount required for converting residual oxygen present in the feed nitrogen to a mixture of carbon dioxide and moisture.

Steel samples heat treated in accord with this procedure were found to have uniform, tightly packed oxide layer on the surface. Thus the introduction of non-cryogenically produced nitrogen pre-mixed with two times the stoichiometric amount of natural gas into a continuous heat treating furnace through an open tube located in the transition zone would result in an acceptable process for oxide annealing steel at 950° C.

EXAMPLE 1-6C

The carbon steel annealing experiment described in Example 1-6A was repeated using the same furnace, temperature, samples, location of feed gas, nature of feed gas device, flow rate and composition of feed gas, and annealing procedure with the exception of adding 1.0% natural gas to the feed gas with the amount of natural gas being 4.0 times stoichiometric amount required for converting residual oxygen present in the feed nitrogen to a mixture of carbon dioxide and moisture.

Steel samples heat treated in accord with this procedure were found to have uniform, tightly packed oxide layer on the surface. The residual oxygen present in the feed nitrogen was converted in the heating zone to a mixture of carbon monoxide, carbon dioxide, and moisture, as shown in Table 1. The surface of the samples was oxidized uniformly in the cooling zone due to the presence of large amount of residual oxygen (see Table 1), resulting in uniform and controlled oxidation of the surface of the samples.

Thus the introduction of non-cryogenically produced nitrogen pre-mixed with four times the stoichiometric amount of natural gas into a continuous heat treating furnace through an open tube located in the transition zone would result in an acceptable process for oxide annealing steel at 950° C. However, it would not result in an acceptable process for bright annealing steel at 950° C. The result of this example showed that it is desirable to maintain either $pCO/pCO_2$ ratio lower than 2.4 or $pH_2/pH_2O$ ratio lower than 1.6 in the heating zone to produce uniform and controlled oxide surface on the steel samples.

EXAMPLES 1-7 AND 1-8

The carbon steel annealing experiment described in Example 1-6A was repeated two times using the same furnace, temperature, samples, location of feed gas, nature of feed gas device, flow rate and composition of feed gas, and annealing procedure with the exception of adding 2.0 and 3.0% natural gas to the feed gas with the amount of natural gas being 8.0 and 12.0 times stoichiometric amount, respectively, required for converting residual oxygen present in the feed nitrogen to a mixture of carbon dioxide and moisture.

Steel samples heat treated in accord with these procedures were found to be oxidized non-uniformly. The residual oxygen present in the feed nitrogen was converted in the heating zone to a mixture of carbon monoxide and moisture. The presence of high $pCO/pCO_2$ (>2.4) and $pH_2/pH_2O$ (>1.6) ratios in the heating zone probably reduced the surface of the samples, but the surface of the samples oxidized non-uniformly in the cooling zone due to the presence of large amount of residual oxygen in the cooling zone (see Table 1).

Thus the introduction of non-cryogenically produced nitrogen pre-mixed with 8.0, and 12.0 times the stoichiometric amount of natural gas into a continuous heat treating furnace through an open tube located in the transition zone would result in an unacceptable process for oxide annealing or bright annealing steel at 950° C. The result of these examples showed that it is desirable to maintain low $pCO/pCO_2$ ratio (<2.4) or $pH_2/pH_2O$ ratio (<1.6) in the heating zone to produce uniform and controlled oxide surface on the steel samples.

EXAMPLE 1-9A

The carbon steel annealing experiment described in Example 1-1 was repeated using the same furnace, samples, location of feed gas, nature of feed gas device, flow rate and composition of feed gas, and annealing procedure with the exceptions of using 0.35% natural gas and 850° C. temperature. The amount of natural gas added in this example was equal to 1.4 times the stoichiometric amount required for converting residual oxygen present in the feed nitrogen to a mixture of carbon dioxide and moisture.

Steel samples heat treated in accord with this procedure were found to have a uniform, tightly packed oxide layer on the surface. Thus the introduction of non-cryogenically produced nitrogen pre-mixed with more than stoichiometric amount of natural gas into a continuous heat treating furnace through an open tube located in the transition zone would result in an acceptable process for oxide annealing steel at 850° C. However, it would not result in an acceptable process for bright annealing steel at 850° C.

EXAMPLE 1-9B

The carbon steel annealing experiment described in Example 1-9A was repeated using the same furnace, temperature, samples, location of feed gas, nature of feed gas device, flow rate and composition of feed gas, and annealing procedure with the exception of adding 0.50% natural gas to the feed gas with the amount of natural gas being 2.0 times stoichiometric amount required for converting residual oxygen present in the feed nitrogen to a mixture of carbon dioxide and moisture.

Steel samples heat treated in accord with this procedure were found to have uniform, tightly packed oxide layer on the surface. Thus the introduction of non-cryogenically produced nitrogen pre-mixed with two times the stoichiometric amount of natural gas into a continuous heat treating furnace through an open tube located in the transition zone would result in an acceptable process for oxide annealing steel at 850° C.

EXAMPLE 1-9C

The carbon steel annealing experiment described in Example 1-9A was repeated using the same furnace, temperature, samples, location of feed gas, nature of feed gas device, flow rate and composition of feed gas, and annealing procedure with the exception of adding 1.0% natural gas to the feed gas with the amount of natural gas being 4.0 times stoichiometric amount required for converting residual oxygen present in the feed nitrogen to a mixture of carbon dioxide and moisture.

Steel samples heat treated in accord with this procedure were found to have a uniform, tightly packed oxide layer on the surface. Thus the introduction of non-cryogenically produced nitrogen pre-mixed with four times the stoichiometric amount of natural gas into a continuous heat treating furnace through an open tube located in the transition zone would result in an acceptable process for oxide annealing steel at 850° C. However, it would not result in an acceptable process for bright annealing steel at 850° C.

EXAMPLE 1-9D

The carbon steel annealing experiment described in Example 1-9A was repeated using the same furnace, temperature, samples, location of feed gas, nature of feed gas device, flow rate and composition of feed gas, and annealing procedure with the exception of adding 2.0% natural gas to the feed gas with the amount of natural gas being 8.0 times stoichiometric amount required for converting residual oxygen present in the feed nitrogen to a mixture of carbon dioxide and moisture.

Steel samples heat treated in accord with this procedure were found to have a uniform, tightly packed oxide layer on the surface. Thus the introduction of non-cryogenically produced nitrogen pre-mixed with eight times the stoichiometric amount of natural gas into a continuous heat treating furnace through an open tube located in the transition zone would result in an acceptable process for oxide annealing steel at 850° C. However, it would not result in an acceptable process for bright annealing steel at 850° C.

EXAMPLE 1-10A

The carbon steel annealing experiment described in Example 1-1 was repeated using the same furnace, samples, location of feed gas, nature of feed gas device, flow rate and composition of feed gas, and annealing procedure with the exception of using 750° C. temperature. The amount of natural gas added in this example was equal to the stoichiometric amount required for converting residual oxygen present in the feed nitrogen to a mixture of carbon dioxide and moisture.

Steel samples heat treated in accord with this procedure were found to have a uniform, tightly packed oxide layer on the surface. Thus the introduction of non-cryogenically produced nitrogen pre-mixed with stoichiometric amount of natural gas into a continuous heat treating furnace through an open tube located in the transition zone would result in an acceptable process for oxide annealing steel at 750° C. However, it would not result in an acceptable process for bright annealing steel at 750° C.

EXAMPLE 1-10B

The carbon steel annealing experiment described in Example 1-10A was repeated using the same furnace, temperature, samples, location of feed gas, nature of feed gas device, flow rate and composition of feed gas, and annealing procedure with the exception of adding 0.50% natural gas to the feed gas with the amount of natural gas being 2.0 times stoichiometric amount required for converting residual oxygen present in the feed nitrogen to a mixture of carbon dioxide and moisture.

Steel samples heat treated in accord with this procedure were found to have a uniform, tightly packed oxide layer on the surface. Thus the introduction of non-cryogenically produced nitrogen pre-mixed with two times the stoichiometric amount of natural gas into a continuous heat treating furnace through an open tube located in the transition zone would result in an acceptable process for oxide annealing steel at 750° C.

EXAMPLE 1-10C

The carbon steel annealing experiment described in Example 1-10A was repeated using the same furnace, temperature, samples, location of feed gas, nature of feed gas device, flow rate and composition of feed gas, and annealing procedure with the exception of adding 1.0% natural gas to the feed gas with the amount of natural gas being 4.0 times stoichiometric amount required for converting residual oxygen present in the feed nitrogen to a mixture of carbon dioxide and moisture.

Steel samples heat treated in accord with this procedure were found to have a uniform, tightly packed oxide layer on the surface. Thus the introduction of non-cryogenically produced nitrogen pre-mixed with four times the stoichiometric amount of natural gas into a continuous heat treating furnace through an open tube located in the transition zone would result in an acceptable process for oxide annealing steel at 750° C. However, it would not result in an acceptable process for bright annealing steel at 750° C.

EXAMPLE 1-10D

The carbon steel annealing experiment described in Example 1-10A was repeated using the same furnace, temperature, samples, location of feed gas, nature of feed gas device, flow rate and composition of feed gas, and annealing procedure with the exception of adding 2.0% natural gas to the feed gas with the amount of natural gas being 8.0 times stoichiometric amount required for converting residual oxygen present in the feed nitrogen to a mixture of carbon dioxide and moisture.

Steel samples heat treated in accord with this procedure were found to have uniform, tightly packed oxide layer on the surface. Thus the introduction of non-cryogenically produced nitrogen pre-mixed with eight times the stoichiometric amount of natural gas into a continuous heat treating furnace through an open tube located in the transition zone would result in an acceptable process for oxide annealing steel at 750° C. However, it would not result in an acceptable process for bright annealing steel at 750° C.

EXAMPLE 1-11

Carbon steel was treated by the process of Example 1-1 with the exception of feeding the gaseous mixture through a $\frac{1}{2}$ in. diameter steel tube fitted with a $\frac{3}{4}$ in. diameter elbow with the opening facing down, i.e., facing the samples and the open feed tube inserted into the furnace through the cooling zone to introduce feed gas into the heating zone of the furnace 60 at location 74 in FIG. 4. The feed gas entering the heating zone of the furnace impinged directly on the samples simulating the introduction of feed gas through an open tube into the heating zone of the furnace. The amount of natural gas used was 0.25% of the feed gas. It was therefore equal to the stoichiometric amount required for the complete conversion of residual oxygen present in the feed nitrogen to a mixture of carbon dioxide and moisture.

Steel samples heat treated in accord with this procedure were found to be oxidized non-uniformly. The residual oxygen present in the feed nitrogen was converted in the heating zone to a mixture of carbon monoxide, carbon dioxide, and moisture. The presence of large amount of residual oxygen and the ratios of $pCO/pCO_2$ and $pH_2/pH_2O$ equal to or less than 1.0 in the cooling zone were ideal for oxidizing the surface of the samples in a controlled manner (see Table 1). However, the samples were oxidized non-uniformly. A detailed analysis of the fluid flow and temperature profiles in the furnace indicated that the feed gas was introduced at high velocity and was not heated to a temperature high enough to cause oxygen and natural gas to react completely in the vicinity of the open feed tube, resulting in the direct impingement of the cold nitrogen with unreacted oxygen on the samples and concomitantly in non-uniform oxidation.

Thus a conventional open feed tube cannot be used to introduce non-cryogenically produced nitrogen pre-mixed with stoichiometric amount of natural gas into the heating zone of a continuous furnace to produce uniform and controlled oxidized steel samples.

EXAMPLES 1-12 TO 1-14

The carbon steel annealing experiment described in Example 1-11 was repeated three times using the same furnace, temperature, samples, location of feed gas, nature of feed gas device, flow rate and composition of feed gas, and annealing procedure with the exception of adding 0.5, 1.0, and 3.0% natural gas to the feed gas with the amount of natural gas being 2.0, 4.0, and 12.0 times stoichiometric amount, respectively, required for converting residual oxygen present in the feed nitrogen to a mixture of carbon dioxide and moisture.

Steel samples heat treated in accord with these procedures were found to be oxidized non-uniformly. Thus a conventional open feed tube cannot be used to introduce non-cryogenically produced nitrogen pre-mixed with 2.0, 4.0, and 12.0 times the stoichiometric amount of natural gas into the heating zone of a continuous furnace to produce uniform and controlled oxidized steel samples.

EXAMPLE 1-15

The carbon steel annealing experiment described in Example 1-11 was repeated using the same furnace, temperature, samples, location of feed gas, nature of feed gas device, flow rate and composition of feed gas, and annealing procedure with the exception of adding 5.0% natural gas to the feed gas with the amount of natural gas being 20.0 times stoichiometric amount, respectively, required for converting residual oxygen present in the feed nitrogen to a mixture of carbon dioxide and moisture.

Steel samples heat treated in accord with this procedure were found to have a surface finish that was partly bright and partly oxidized. Thus a conventional open feed tube cannot be used to introduce non-cryogenically produced nitrogen pre-mixed with 20 times the stoichiometric amount of natural gas into the heating zone of a continuous furnace to produce uniform and controlled oxidized or bright steel samples.

EXAMPLE 1-16

The carbon steel annealing experiment described in Example 1-11 was repeated using the same furnace, temperature, samples, location of feed gas, nature of feed gas device, flow rate and composition of feed gas, and annealing procedure with the exception of introducing feed gas into the heating zone of the furnace 60 at location 76 in FIG. 4. The amount of natural gas used was equal to the stoichiometric amount required for converting residual oxygen present in the feed nitrogen to a mixture of carbon dioxide and moisture.

Steel samples heat treated in accord with this procedure were found to be oxidized non-uniformly. Thus a conventional open feed tube once again cannot be used to introduce non-cryogenically produced nitrogen pre-mixed with the stoichiometric amount of natural gas into the heating zone of a continuous furnace to produce uniform and controlled oxidized steel samples.

EXAMPLE 1-17

The carbon steel annealing experiment described in Example 1-16 was repeated using the same furnace, temperature, samples, location of feed gas, nature of feed gas device, flow rate and composition of feed gas, and annealing procedure with the exception of adding 3.0% natural gas in the gaseous feed mixture. The amount of natural gas used was 12.0 times the stoichiometric amount required for converting residual oxygen present in the feed nitrogen to a mixture of carbon dioxide and moisture.

Steel samples heat treated in accord with this procedure were found to be oxidized non-uniformly. Thus a conventional open feed tube once again cannot be used to introduce non-cryogenically produced nitrogen pre-mixed with 12.0 times the stoichiometric amount of natural gas into the heating zone of a continuous furnace to produce uniform and controlled oxidized steel samples.

EXAMPLE 1-18

The carbon steel annealing experiment described in Example 1-11 was repeated using the same furnace, samples, location of feed gas, nature of feed gas device, flow rate and composition of feed gas, and annealing procedure with the exception of using 950° C. temperature, as shown in Table 1. The amount of natural gas added was equal to the stoichiometric amount required for converting residual oxygen present in the feed nitrogen to a mixture of carbon dioxide and moisture.

Steel samples heat treated in accord with this procedure were found to be oxidized non-uniformly. Thus a conventional open feed tube cannot be used to introduce non-cryogenically produced nitrogen pre-mixed with the stoichiometric amount of natural gas into the heating zone of a continuous furnace to produce uniform and controlled oxidized or bright steel samples.

EXAMPLES 1-19 TO 1-20

The carbon steel annealing experiment described in Example 1-18 was repeated two times using the same furnace, temperature, samples, location of feed gas, nature of feed gas device, flow rate and composition of feed gas, and annealing procedure with the exception of adding 0.5 and 1.0 natural gas to the feed gas with the amount of natural gas being 2.0 and 4.0 times stoichiometric amount, respectively, required for converting residual oxygen present in the feed nitrogen to a mixture of carbon dioxide and moisture.

Steel samples heat treated in accord with these procedures were found to be oxidized non-uniformly. Thus a conventional open feed tube cannot be used to introduce non-cryogenically produced nitrogen pre-mixed with 2.0 and 4.0 times the stoichiometric amount of natural gas into the heating zone of a continuous furnace to produce uniform and controlled oxidized steel samples.

Analysis of the data of Table 1 relating to the above examples showed that a straight open tube located in the heating zone of the furnace cannot be used to introduce non-cryogenically produced nitrogen pre-mixed with natural gas into the furnace and produce controlled oxidized and/or bright, oxide-free annealed carbon steel samples. Although oxygen present in the feed gas was converted to a mixture of carbon monoxide, carbon dioxide and moisture in the heating and cooling zones of the furnace, it was not converted completely to the above mentioned gases in the vicinity of the feed area. This is because of the fact that the feed gas enters the furnace at high velocity and therefore does not get time to heat up and cause residual oxygen and natural gas present in it to react. This results in the impingement of the feed gas with unreacted oxygen on the samples and consequently their uncontrolled oxidation.

Figure 7:
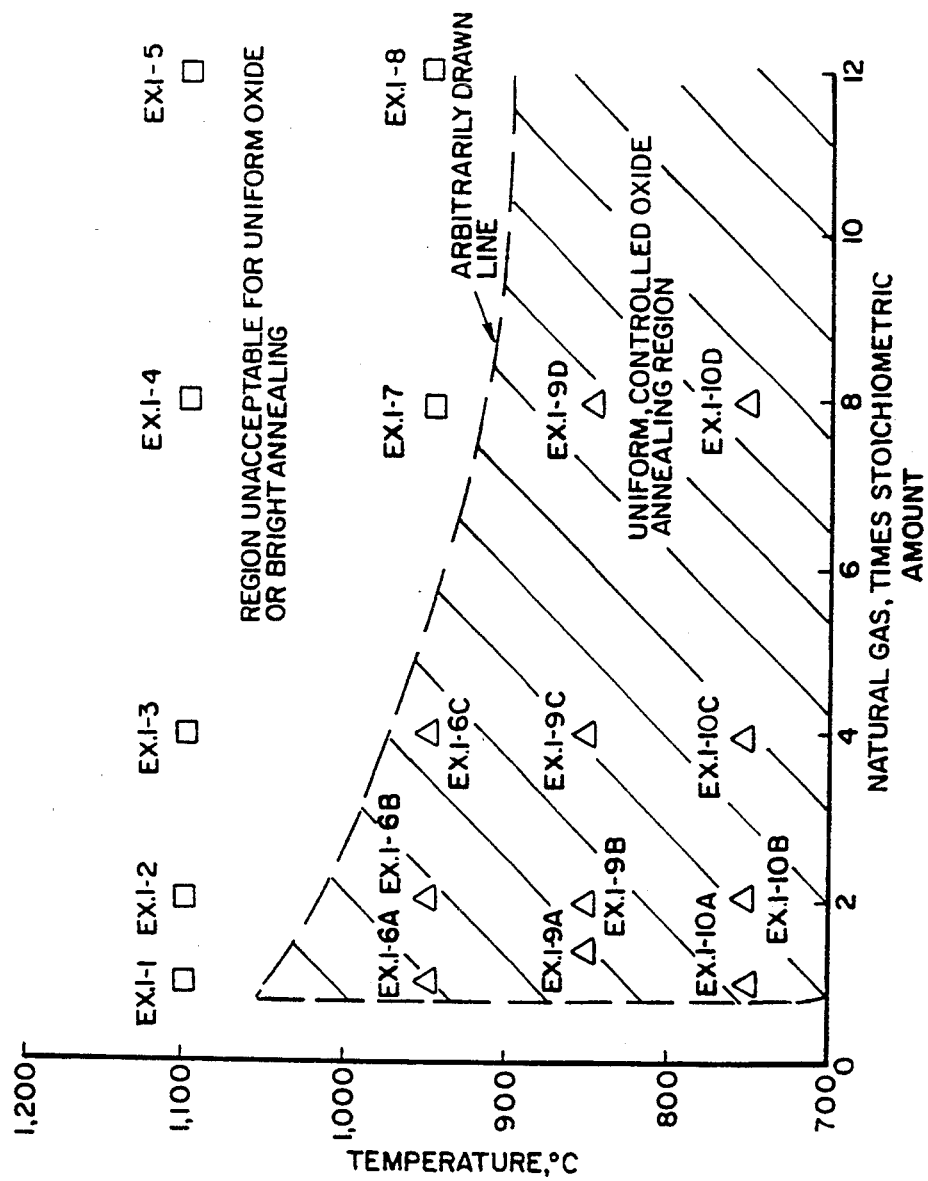
FIG. 7 is a plot of annealing temperature against natural gas requirement for annealing carbon steel according to the invention.

The data in Table 1 showed that a straight open tube located in the transition zone of the furnace can be used under certain conditions to oxide-anneal carbon steel in a controlled manner using a mixture of non-cryogenically produced nitrogen and natural gas. It cannot however be used for bright, oxide-free annealing steel. The acceptable operating region for controlled and uniform oxide annealing steel is shown in FIG. 7.

Since most of the heat treaters generally switch back and forth between controlled oxide annealing and bright (oxide-free) annealing, processes for oxide annealing and bright, oxide-free annealing carbon steel utilizing the same furnace without making major process changes have been developed by introducing a gaseous feed mixture in the heating zone of the furnace as will be shown by the results of samples processed and reported in Table 2 below.

TABLE 2

|  | Example 2-1 | Example 2-2 | Example 2-3 | Example 2-4 | Example 2-5A | Example 2-5B |
|---|---|---|---|---|---|---|
| Heat Treatment Temperature, °C. | 1,100 | 1,100 | 1,100 | 1,100 | 1,100 | 1,100 |
| Flow Rate of Feed Gas, SCFH | 350 | 350 | 350 | 350 | 350 | 350 |
| Feed Gas Location | Heating Zone (Location 72) | Heating Zone (Location 74) | Heating Zone (Location 76) | Heating Zone (Location 76) | Heating Zone (Location 76) | Heating Zone (Location 76) |
| Type of Feed Device | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) |
| Feed Gas Composition | | | | | | |
| Nitrogen, % | 99.50 | 99.50 | 99.50 | 99.40 | 99.25 | 99.25 |
| Oxygen, % | 0.50 | 0.50 | 0.50 | 0.60 | 0.75 | 0.75 |
| Natural Gas* (Methane), % | 2.00 | 2.00 | 2.00 | 2.00 | 2.00 | 2.50 |
| Heating Zone Atmosphere Composition | | | | | | |
| Oxygen, ppm | <2 | <3 | <4 | <4 | <4 | <3 |
| Carbon Monoxide, % | 1.00 | 1.10 | 0.95 | 1.10 | 1.40 | 1.50 |
| Carbon Dioxide, % | 0.00 | 0.00 | 0.00 | 0.00 | 0.00 | 0.00 |
| Hydrogen, % | 2.80 | 3.00 | 2.50 | 2.55 | 2.50 | 3.50 |
| Methane, % | 0.60 | 0.40 | 0.55 | 0.50 | 0.60 | 0.75 |
| Dew Point, °C. | −58.6 | −58.8 | −58.3 | −58.3 | −58.1 | −58.2 |
| Cooling Zone Atmosphere Composition | | | | | | |
| Oxygen, ppm | 550 | <5 | <7 | <8 | ~10 | <6 |
| Carbon Monoxide, % | 0.50 | 0.90 | 0.85 | 0.95 | 1.25 | 1.30 |
| Carbon Dioxide, % | 0.04 | 0.00 | 0.00 | 0.00 | 0.01 | 0.01 |
| Hydrogen, % | 1.00 | 2.60 | 2.50 | 2.55 | 2.50 | 3.10 |
| Methane, % | 1.42 | 0.71 | 0.75 | 0.80 | 0.77 | 0.98 |
| Dew Point, °C. | −9.0 | −27.9 | −31.8 | −25.7 | −20.9 | −21.9 |
| Quality of Heat Treated Samples | Uniform, Tightly Packed Oxide | Uniform Bright | Uniform Bright | Uniform Bright | Uniform Bright with Slight Straw Color | Uniform Bright |

|  | Example 2-6 | Example 2-7A | Example 2-7B | Example 2-7C | Example 2-8 | Example 2-9 |
|---|---|---|---|---|---|---|
| Heat Treatment Temperature, °C. | 1,100 | 1,100 | 1,100 | 1,100 | 1,050 | 1,050 |
| Flow Rate of Feed Gas, SCFH | 350 | 350 | 350 | 350 | 350 | 350 |
| Feed Gas Location | Heating Zone (Location 76) | Heating Zone (Location 76) | Heating Zone (Location 76) | Heating Zone (Location 76) | Heating Zone (Location 76) | Heating Zone (Location 76) |
| Type of Feed Device | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) |
| Feed Gas Composition | | | | | | |
| Nitrogen, % | 99.20 | 99.50 | 99.50 | 99.50 | 99.75 | 99.70 |
| Oxygen, % | 0.80 | 0.50 | 0.50 | 0.50 | 0.25 | 0.30 |
| Natural Gas* (Methane), % | 2.50 | 0.50 | 1.00 | 1.50 | 2.00 | 2.00 |
| Heating Zone Atmosphere Composition | | | | | | |
| Oxygen, ppm | <2 | <6 | <4 | <3 | <9 | <6 |
| Carbon Monoxide, % | 1.55 | 0.40 | 0.85 | 1.00 | 0.50 | 0.60 |
| Carbon Dioxide, % | 0.00 | 0.10 | 0.05 | 0.01 | 0.00 | 0.00 |
| Hydrogen, % | 3.50 | 0.50 | 1.45 | 2.40 | 2.30 | 2.30 |
| Methane, % | 1.10 | 0.04 | 0.05 | 0.08 | 0.65 | 0.70 |
| Dew Point, °C. | −58.2 | −8.8 | −11.3 | −22.3 | −58.3 | −58.5 |
| Cooling Zone Atmosphere Composition | | | | | | |
| Oxygen, ppm | <7 | <9 | <7 | <4 | <8 | <8 |
| Carbon Monoxide, % | 1.35 | 0.15 | 0.60 | 1.40 | 0.50 | 0.60 |
| Carbon Dioxide, % | 0.02 | 0.35 | 0.32 | 0.01 | 0.00 | 0.00 |

TABLE 2-continued

| | | | | | | |
|---|---|---|---|---|---|---|
| Hydrogen, % | 3.05 | 0.15 | 0.90 | 2.20 | 2.30 | 2.25 |
| Methane, % | 0.96 | 0.06 | 0.07 | 0.22 | 0.57 | 0.65 |
| Dew Point, °C. | −19.6 | +6.4 | +11.1 | −3.6 | −52.6 | −44.4 |
| Quality of Heat Treated Samples | Uniform Bright | Uniform, Tightly Packed Oxide | Uniform, Tightly Packed Oxide | Uniform Bright | Uniform Bright | Uniform Bright |

| | Example 2-10 | Example 2-11 | Example 2-12 | Example 2-13 | Example 2-14 | Example 2-15 |
|---|---|---|---|---|---|---|
| Heat Treatment Temperature, °C. | 1,050 | 1,050 | 1,050 | 1,050 | 1,050 | 1,050 |
| Flow Rate of Feed Gas, SCFH | 350 | 350 | 350 | 350 | 350 | 350 |
| Feed Gas Location | Heating Zone (Location 76) | Heating Zone (Location 76) | Heating Zone (Location 76) | Heating Zone (Location 76) | Heating Zone (Location 76) | Heating Zone (Location 76) |
| Type of Feed Device | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) |
| Feed Gas Composition | | | | | | |
| Nitrogen, % | 99.65 | 99.60 | 99.60 | 99.55 | 99.50 | 99.50 |
| Oxygen, % | 0.35 | 0.40 | 0.40 | 0.45 | 0.50 | 0.50 |
| Natural Gas* (Methane), % | 2.00 | 2.00 | 2.00 | 2.25 | 2.25 | 2.00 |
| Heating Zone Atmosphere Composition | | | | | | |
| Oxygen, ppm | <6 | <6 | <4 | <4 | <4 | <5 |
| Carbon Monoxide, % | 0.60 | 0.75 | 0.80 | 0.90 | 0.95 | 0.90 |
| Carbon Dioxide, % | 0.00 | 0.00 | 0.00 | 0.00 | 0.00 | 0.00 |
| Hydrogen, % | 2.10 | 2.10 | 2.60 | 2.65 | 2.70 | 2.40 |
| Methane, % | 0.80 | 0.80 | 0.70 | 0.80 | 0.90 | 0.80 |
| Dew Point, °C. | −58.3 | −58.3 | −58.3 | −58.3 | −58.3 | −58.4 |
| Cooling Zone Atmosphere Composition | | | | | | |
| Oxygen, ppm | <9 | <9 | <5 | <5 | <7 | <6 |
| Carbon Monoxide, % | 0.60 | 0.70 | 0.75 | 0.85 | 0.90 | 0.85 |
| Carbon Dioxide, % | 0.00 | 0.00 | 0.00 | 0.00 | 0.00 | 0.00 |
| Hydrogen, % | 2.20 | 2.10 | 2.60 | 2.70 | 2.70 | 2.40 |
| Methane, % | 0.69 | 0.73 | 0.78 | 0.86 | 0.90 | 0.78 |
| Dew Point, °C. | −41.3 | −35.9 | −41.2 | −36.9 | −33.1 | −32.6 |
| Quality of Heat Treated Samples | Uniform Bright | Uniform Bright | Uniform Bright | Uniform Bright | Uniform Bright | Uniform Bright |

| | Example 2-16 | Example 2-17A | Example 2-17B | Example 2-17C | Example 2-18 |
|---|---|---|---|---|---|
| Heat Treatment Temperature, °C. | 1,050 | 1,000 | 1,000 | 1,000 | 1,000 |
| Flow Rate of Feed Gas, SCFH | 350 | 350 | 350 | 350 | 350 |
| Feed Gas Location | Heating Zone (Location 76) | Heating Zone (Location 76) | Heating Zone (Location 76) | Heating Zone (Location 76) | Heating Zone (Location 76) |
| Type of Feed Device | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) |
| Feed Gas Composition | | | | | |
| Nitrogen, % | 99.50 | 99.70 | 99.70 | 99.70 | 99.75 |
| Oxygen, % | 0.50 | 0.30 | 0.30 | 0.30 | 0.25 |
| Natural Gas* (Methane), % | 1.50 | 2.00 | 1.50 | 1.00 | 2.00 |
| Heating Zone Atmosphere Composition | | | | | |
| Oxygen, ppm | <5 | <3 | <6 | ~10 | <4 |
| Carbon Monoxide, % | 1.00 | 0.40 | 0.60 | 0.35 | 0.35 |
| Carbon Dioxide, % | 0.00 | 0.00 | 0.00 | 0.01 | 0.00 |
| Hydrogen, % | 2.15 | 1.20 | 1.20 | 1.05 | 1.10 |
| Methane, % | 0.40 | 1.10 | 0.40 | 0.40 | 1.10 |
| Dew Point, °C. | −29.4 | −57.7 | −33.8 | −29.1 | −57.9 |
| Cooling Zone Atmosphere Composition | | | | | |
| Oxygen, ppm | <6 | <9 | <9 | ~11 | <7 |
| Carbon Monoxide, % | 1.00 | 0.40 | 0.60 | 0.35 | 0.35 |
| Carbon Dioxide, % | 0.01 | 0.00 | 0.00 | 0.01 | 0.00 |
| Hydrogen, % | 2.20 | 1.60 | 1.20 | 1.00 | 1.70 |
| Methane, % | 0.35 | 1.02 | 0.37 | 0.33 | 1.02 |
| Dew Point, °C. | −22.1 | −57.7 | −29.1 | −23.6 | −57.9 |
| Quality of Heat Treated Samples | Uniform Bright | Uniform Bright | Uniform Bright | Uniform Bright with Slight Straw Color | Uniform Bright |

| | Example 2-19 | Example 2-20 | Example 2-21 | Example 2-22 | Example 2-23 |
|---|---|---|---|---|---|
| Heat Treatment Temperature, °C. | 1,000 | 1,000 | 950 | 950 | 950 |
| Flow Rate of Feed Gas, SCFH | 350 | 350 | 350 | 350 | 350 |
| Feed Gas Location | Heating Zone (Location 76) | Heating Zone (Location 76) | Heating Zone (Location 76) | Heating Zone (Location 76) | Heating Zone (Location 76) |
| Type of Feed Device | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) |
| Feed Gas Composition | | | | | |
| Nitrogen, % | 99.80 | 99.85 | 99.90 | 99.925 | 99.95 |

TABLE 2-continued

| | | | | | |
|---|---|---|---|---|---|
| Oxygen, % | 0.20 | 0.15 | 0.10 | 0.075 | 0.05 |
| Natural Gas* (Methane), % | 2.00 | 2.00 | 2.00 | 1.75 | 1.25 |
| Heating Zone Atmosphere Composition | | | | | |
| Oxygen, ppm | <3 | <3 | <3 | <2 | <3 |
| Carbon Monoxide, % | 0.30 | 0.20 | 0.10 | 0.10 | 0.10 |
| Carbon Dioxide, % | 0.00 | 0.00 | 0.00 | 0.00 | 0.00 |
| Hydrogen, % | 1.05 | 0.9 | 0.80 | 0.50 | 0.30 |
| Methane, % | 1.10 | 1.12 | 1.32 | 1.12 | 0.60 |
| Dew Point, °C. | −57.9 | −57.9 | −58.1 | −57.7 | −33.8 |
| Cooling Zone Atmosphere Composition | | | | | |
| Oxygen, ppm | <6 | <8 | ~10 | <87 | <7 |
| Carbon Monoxide, % | 0.25 | 0.25 | 0.15 | 0.10 | 0.10 |
| Carbon Dioxide, % | 0.00 | 0.00 | 0.00 | 0.00 | 0.00 |
| Hydrogen, % | 1.70 | 1.60 | 1.30 | 0.50 | 0.30 |
| Methane, % | 1.02 | 0.87 | 1.18 | 1.10 | 0.60 |
| Dew Point, °C. | −58.0 | −57.9 | −58.1 | −57.9 | −58.1 |
| Quality of Heat Treated Samples | Uniform Bright | Uniform Bright | Uniform Bright | Uniform Bright | Uniform Bright |

*Natural gas was mixed with nitrogen and added as a percent of total non-cryogenically produced nitrogen.

EXAMPLE 2-1

The carbon steel annealing experiment described in Example 1-14 was repeated using the same furnace, temperature, samples, flow rate and composition of feed gas, and annealing procedure with the exceptions of adding 2.0% natural gas in the gaseous feed mixture and introducing the gaseous feed mixture into the heating zone of the furnace (Location 72 in FIG. 4) through a modified porous diffuser. A generally cylindrical shaped diffuser 40 shown in FIG. 3C comprising a top half 44 of ¾ in. diameter, 6 in. long porous Inconel material was assembled. The porous Inconel material had about forty-seven 0.094 inch diameter holes per square inch. The holes were staggered with about 0.156 inch distance between the two closest holes. The number of holes and hole pattern provided about 33% open area for the flow of gaseous mixture. Bottom half 46 of diffuser 40 was a gas impervious Inconel with one end 42 of diffuser 40 capped and the other end 43 attached to a ½ in. diameter stainless steel feed tube inserted into the furnace 60 through the cooling end vestibule 68. The bottom half 46 of diffuser 40 was positioned parallel to the parts 16' (prime) being treated thus essentially directing the flow of feed gas towards the hot ceiling of the furnace and preventing the direct impingement of the feed gas with unreacted oxygen on the samples 16'. The amount of natural gas used in this example was 8.0 times the stoichiometric amount required for the conversion of residual oxygen to a mixture of carbon dioxide and moisture.

Steel samples heat treated in accord with this procedure were found to have uniform, tightly packed oxide layer on the surfaces. The residual oxygen present in the feed nitrogen was converted in the heating zone to a mixture of carbon monoxide and moisture. The presence of high $pCO/pCO_2$ (>2.8) and $pH_2/pH_2O$ (>1.3) ratios probably reduced the surface of the samples in the heating zone. The surface of the samples was however oxidized in the cooling zone due to the presence of large amount of residual oxygen (see Table 2).

Thus the introduction of non-cryogenically produced nitrogen pre-mixed with 8.0 times the stoichiometric amount of natural gas into a continuous heat treating furnace through a modified porous diffuser located in the heating zone (Location 72) would result in an acceptable process for oxide annealing steel at 1,100° C. Since the modified porous diffuser was located only 12 in. (Location 72) away from the cooling zone, all the residual oxygen present in the feed gas was not reacted with natural gas prior to entering the cooling zone. The residual oxygen (550 ppm) present in the cooling zone caused the samples to oxidize in a controlled manner, as shown in Table 2. Therefore, the introduction of gaseous feed mixture into the heating zone (Location 72) through a modified porous diffuser would always result in uniformly oxidized samples provided that the amount of natural gas or any other hydrocarbon used is more than the stoichiometric amount required for the complete conversion of residual oxygen to a mixture of carbon dioxide and moisture.

EXAMPLE 2-2

The carbon steel annealing experiment described in Example 2-1 was repeated using the same furnace, temperature, samples, flow rate and composition of feed gas, type of gas feeding device, and annealing procedure with the exception of introducing the gaseous feed mixture into the heating zone of the furnace (Location 74 in FIG. 4). The amount of natural gas used In this example was 8.0 times the stoichiometric amount required for the conversion of residual oxygen to a mixture of carbon dioxide and moisture.

Steel samples heat treated in accord with this procedure were found to have uniformly bright, oxide-free surfaces. The residual oxygen present in the feed nitrogen was converted almost completely (less than 5 ppm) in the heating and cooling zones to a mixture of carbon monoxide and moisture. The presence of substantial amounts of carbon monoxide and hydrogen or the presence of high $pCO/pCO_2$ (>2.8) and $pH_2/pH_2O$ (>1.3) ratios both in the heating and cooling zones resulted in reducing the surface of the samples.

Thus the introduction of non-cryogenically produced nitrogen pre-mixed with 8.0 times the stoichiometric amount of natural gas into a continuous heat treating furnace through a modified porous diffuser located in the heating zone (Location 74) would result in an acceptable process for bright, oxide-free annealing steel at 1,100° C.

This example therefore showed are critical steps of the process involves the method of introducing the mixture into the furnace. For example, most of the residual oxygen present in the feed gas was converted to carbon monoxide and moisture simply by placing the modified porous diffuser 30 in. (Location 74) away from the cooling zone instead of only 12 in. (Location 72). Therefore, the introduction of gaseous feed mixture into the heating zone (Location 74) through a modified porous diffuser at 1,100° C. would always result in bright, oxide-free samples with non-cryogenically produced nitrogen provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ greater than 2.8 and $pH_2/pH_2O$ greater than 1.3 both in the heating and cooling zones, and that the residual oxygen level in both the heating and cooling zones is less than 10 ppm.

EXAMPLE 2-3

The carbon steel annealing experiment described in Example 2-1 was repeated using the same furnace, temperature, samples, flow rate and composition of feed gas, type of gas feeding device, and annealing procedure with the exception of introducing the gaseous feed mixture into the heating zone of the furnace (Location 76 in FIG. 4). The amount of natural gas used in this example was 8.0 times the stoichiometric amount required for the conversion of residual oxygen to a mixture of carbon dioxide and moisture.

Steel samples heat treated in accord with this procedure were found to have uniformly bright, oxide-free surfaces. This example once again showed the critical nature of placing the modified diffuser in the furnace. For example, most of the residual oxygen present in the feed gas was once again converted to carbon monoxide and moisture simply by moving the modified porous diffuser from 12 in. (Location 72) to 40 in. (Location 76) away from the cooling zone. Therefore, the introduction of non-cryogenically produced nitrogen into the heating zone (Location 76) through a modified porous diffuser at 1,100° C. would always result in uniform bright, oxide-free samples provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ greater than 2.8 and $pH_2/pH_2O$ greater than 1.3 both in the heating and cooling zones, and that the residual oxygen level in both the heating and cooling zones is less than 10 ppm.

The incoming steel material and the steel sample heat treated in this example were examined for extent of decarburization or carburization. Examination of incoming material showed neither carburization or decarburization while the steel sample heat treated in the non-cryogenically produced nitrogen atmosphere premixed with natural gas produced decarburization of approximately 0.006 inches. The decarburization of steel sample was probably caused by the presence of high dew point in the cooling zone.

EXAMPLE 2-4

The carbon steel annealing experiment described in Example 2-3 was repeated using the same furnace, temperature, samples, flow rate of feed gas, type and location of gas feeding device, and annealing procedure with the exception of using non-cryogenically produced nitrogen containing 99.4% $N_2$ and 0.6% $O_2$. The amount of natural gas used in this example was approximately 6.7 times the stoichiometric amount required for the conversion of residual oxygen to a mixture of carbon dioxide and moisture.

Steel samples heat treated in accord with this procedure were found to have uniformly bright, oxide-free surfaces. The residual oxygen present in the feed nitrogen was converted almost completely (less than 8 ppm) in the heating and cooling zones to a mixture of carbon monoxide and moisture, as shown in Table 2.

This example once again showed that a modified porous diffuser located well inside the heating zone of the furnace operated at 1,100° C. can be used to bright, oxide-free anneal carbon steel with non-cryogenically produced nitrogen provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ greater than 2.8 and $pH_2/pH_2O$ greater than 1.3 both in the heating and cooling zones, and that the residual oxygen level in both the heating and cooling zones is less than 10 ppm.

EXAMPLE 2-5A

The carbon steel annealing experiment described in Example 2-3 was repeated using the same furnace, temperature, samples, flow rate of feed gas, type and location of gas feeding device, and annealing procedure with the exception of using non-cryogenically produced nitrogen containing 99.25 $N_2$ and 0.75 $O_2$. The amount of natural gas used in this example was approximately 5.3 times the stoichiometric amount required for the conversion of residual oxygen to a mixture of carbon dioxide and moisture.

Steel samples heat treated in accord with this procedure were found to have uniformly bright surface. The surface of the samples however had a slight straw color, making the surface finish to be marginally acceptable. The residual oxygen present in the feed nitrogen was converted almost completely (approximately 10 ppm) in the heating and cooling zones to a mixture of carbon monoxide and moisture.

This example once again showed that a modified porous diffuser located well inside the heating zone of the furnace operated at 1,100° C. can be used to bright, oxide-free anneal carbon steel with non-cryogenically produced nitrogen provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ greater than 2.8 and $pH_2/pH_2O$ greater than 1.3 both in the heating and cooling zones, and that the residual oxygen level in both the heating and cooling zones is less than 10 ppm. This example also showed that the minimum amount of natural gas required for bright annealing steel is about 5.0 times the stoichiometric amount needed for complete conversion of residual oxygen present in the feed nitrogen to a mixture of carbon dioxide and moisture.

EXAMPLE 2-5B

The carbon steel annealing experiment described in Example 2-5A was repeated using the same furnace, temperature, samples, flow rate and composition of feed gas, type and location of gas feeding device, and annealing procedure with the exception of using 2.5% natural gas instead of 2.0%. The amount of natural gas used in this example was approximately 6.7 times the stoichiometric amount required for the conversion of residual oxygen to a mixture of carbon dioxide and moisture.

Steel samples heat treated in accord with this procedure were found to have uniformly bright, oxide-free surfaces. The surface of each sample was also free of straw color. The residual oxygen present in the feed nitrogen was converted almost completely (less than 6 ppm) in the heating and cooling zones to a mixture of carbon monoxide and moisture.

This example once again showed that a modified porous diffuser located well inside the heating zone of the furnace operated at 1,100° C. can be used to bright, oxide-free anneal carbon steel with non-cryogenically produced nitrogen provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ greater than 2.8 and $pH_2/pH_2O$ greater than 1.3 both in the heating and cooling zones, and that the residual oxygen level in both the heating and cooling zones is less than 10 ppm.

Examination of incoming material showed neither carburization or decarburization while the steel sample heat treated in this example produced decarburization of approximately 0.007 inches. The extent of decarburization in the sample heat treated in this example was higher than the one treated in Example 2-3, probably due to the presence of higher dew point in the cooling zone (see Table 2).

EXAMPLE 2-6

The carbon steel annealing experiment described in Example 2-3 was repeated using the same furnace, temperature, samples, flow rate of feed gas, type and location of gas feeding device, and annealing procedure with the exception of using non-cryogenically produced nitrogen containing 99.2% $N_2$ and 0.8% $O_2$. The amount of natural gas used in this example was approximately 6.3 times the stoichiometric amount required for the conversion of residual oxygen to a mixture of carbon dioxide and moisture.

Steel samples heat treated in accord with this procedure were found to have uniformly bright, oxide-free surfaces. The residual oxygen present in the feed nitrogen was converted almost completely (less than 7 ppm) in the heating and cooling zones to a mixture of carbon monoxide and moisture.

This example once again showed that a modified porous diffuser located well inside the heating zone of the furnace operated at 1,100° C. can be used to bright, oxide-free anneal carbon steel with non-cryogenically produced nitrogen provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ greater than 2.8 and $pH_2/pH_2O$ greater than 1.3 both in the heating and cooling zones, and that the residual oxygen level in both the heating and cooling zones is less than 10 ppm.

EXAMPLE 2-7A

The carbon steel annealing experiment described in Example 2-3 was repeated using the same furnace, temperature, samples, flow rate and composition of feed gas, type and location of gas feeding device, and annealing procedure with the exception of using 0.50% natural gas instead of 2.0%. The amount of natural gas used in this example was approximately 2.0 times the stoichiometric amount required for the conversion of residual oxygen to a mixture of carbon dioxide and moisture.

Steel samples heat treated in accord with this procedure were found to have uniform, tightly packed oxide surface finishes. The residual oxygen present in the feed nitrogen was converted almost completely (less than 8 ppm) in the heating and cooling zones to a mixture of carbon monoxide, carbon dioxide, and moisture, as shown in Table 2. The samples were oxidized due to the presence of low $pCO/pCO_2$ (<2.8) and $pH_2/pH_2O$ (<1.3) ratios in the cooling zone.

This example showed that a modified porous diffuser located well inside the heating zone of the furnace operated at 1,100° C. can be used to controlled oxide anneal carbon steel with non-cryogenically produced nitrogen provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ lower than 2.8 and $pH_2/pH_2O$ lower than 1.3 in the cooling zone.

EXAMPLE 2-7B

The carbon steel annealing experiment described in Example 2-7A was repeated using the same furnace, temperature, samples, flow rate and composition of feed gas, type and location of gas feeding device, and annealing procedure with the exception of using 1.0% natural gas. The amount of natural gas used in this example was approximately 4.0 times the stoichiometric amount required for the conversion of residual oxygen to a mixture of carbon dioxide and moisture.

Steel samples heat treated in accord with this procedure were found to have uniform, tightly packed oxide surface finishes. The residual oxygen present in the feed nitrogen was converted almost completely (less than 8 ppm) in the heating and cooling zones to a mixture of carbon monoxide, carbon dioxide, and moisture, as shown in Table 2. The samples were oxidized due to the presence of low $pCO/pCO_2$ (<2.8) and $pH_2/pH_2O$ (<1.3) ratios in the cooling zone.

This example once again showed that a modified porous diffuser located well inside the heating zone of the furnace operated at 1,100° C. can be used to oxide anneal carbon steel with non-cryogenically produced nitrogen provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ lower than 2.8 and $pH_2/pH_2O$ lower than 1.3 in the cooling zones.

EXAMPLE 2-7C

The carbon steel annealing experiment described in Example 2-7A was repeated using the same furnace, temperature, samples, flow rate and composition of feed gas, type and location of gas feeding device, and annealing procedure with the exception of using 1.5% natural gas. The amount of natural gas used in this example was approximately 6.0 times the stoichiometric amount required for the conversion of residual oxygen to a mixture of carbon dioxide and moisture.

Steel samples heat treated in accord with this procedure were found to have uniformly bright, oxide-free surfaces. The residual oxygen present in the feed nitrogen was converted almost completely (less than 4 ppm)

in the heating and cooling zones to a mixture of carbon monoxide, carbon dioxide, and moisture, as shown in Table 2.

This example showed that a modified porous diffuser located well inside the heating zone of the furnace operated at 1,100° C. can be used to bright, oxide-free anneal carbon steel with non-cryogenically produced nitrogen provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ greater than 2.8 and $pH_2/pH_2O$ greater than 1.3 both in the heating and cooling zones, and that the residual oxygen level in both the heating and cooling zones is less than 10 ppm.

EXAMPLE 2-8

The carbon steel annealing experiment described in Example 2-3 was repeated using the same furnace, samples, flow rate of feed gas, type and location of gas feeding device, and annealing procedure with the exceptions of using 1,050° C. temperature and non-cryogenically produced nitrogen containing 99.75% $N_2$ and 0.25% $O_2$. The amount of natural gas used in this example was 16.0 times the stoichiometric amount required for the conversion of residual oxygen to a mixture of carbon dioxide and moisture.

Steel samples heat treated in accord with this procedure were found to have uniformly bright, oxide-free surfaces. The residual oxygen present in the feed nitrogen was converted almost completely (less than 9 ppm) in the heating and cooling zones to a mixture of carbon monoxide and moisture.

This example showed that a modified porous diffuser located well inside the heating zone of the furnace operated at 1,050° C. can be used to bright, oxide-free anneal carbon steel with non-cryogenically produced nitrogen provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ greater than 2.6 and $pH_2/pH_2O$ greater than 1.4 both in the heating and cooling zones, and that the residual oxygen level in both the heating and cooling zones is less than 10 ppm.

Examination of incoming material showed neither carburization or decarburization while the steel sample heat treated in the non-cryogenically produced nitrogen atmosphere pre-mixed with natural gas in this example produced marginal decarburization—the depth of decarburization was approximately 0.001 inches. This example therefore showed that the extent of decarburization in the samples heat treated in the non-cryogenically produced nitrogen atmosphere pre-mixed with natural gas can be controlled by controlling dew point both in the cooling as well as heating zones of a continuous furnace.

EXAMPLES 2-9 TO 2-15

The carbon steel annealing experiment described in Example 2-8 was repeated seven times in Examples 2-9 to 2-15 using the same furnace, samples, flow rate of feed gas, temperature, type and location of gas feeding device, and annealing procedure with the exceptions of using the amount of natural gas varying from 2.0 to 2.25% and non-cryogenically produced nitrogen containing 99.70 to 99.50% $N_2$ and 0.30 to 0.50% $O_2$, as shown in Table 2. The amount of natural gas used in these examples varied from 8.0 to approximately 13.3 times the stoichiometric amount required for the conversion of residual oxygen to a mixture of carbon dioxide and moisture.

Steel samples heat treated in these examples were found to have uniformly bright, oxide-free surfaces. The residual oxygen present in the feed nitrogen was converted almost completely (less than 9 ppm) in the heating and cooling zones to a mixture of carbon monoxide and moisture.

These examples once again showed that a modified porous diffuser located well inside the heating zone of the furnace operated at 1,050° C. can be used to bright, oxide-free anneal carbon steel with non-cryogenically produced nitrogen provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ greater than 2.6 and $pH_2/pH_2O$ greater than 1.4 both in the heating and cooling zones, and that the residual oxygen level in both the heating and cooling zones is less than 10 ppm.

Examination of incoming material showed neither carburization or decarburization. The steel sample heat treated in Example 2-10 in the non-cryogenically produced nitrogen atmosphere pre-mixed with natural gas in this example also produced neither decarburization nor carburization. This example therefore showed that non-cryogenically produced nitrogen atmosphere pre-mixed with natural gas can be used for neutral hardening carbon steel by carefully controlling the dew point both in the cooling and heating zones of a continuous furnace.

EXAMPLE 2-16

The carbon steel annealing experiment described in Example 2-15 was repeated using the same furnace, samples, temperature, flow rate and composition of feed gas, type and location of gas feeding device, and annealing procedure with the exceptions of using 1.5% natural gas. The amount of natural gas used in this example was approximately 6.0 times the stoichiometric amount required for the conversion of residual oxygen to a mixture of carbon dioxide and moisture.

Steel samples heat treated in accord with this procedure were found to have uniformly bright, oxide-free surfaces.

This example showed that a modified porous diffuser located well inside the heating zone of the furnace operated at 1,050° C. can be used to bright, oxide-free anneal carbon steel with non-cryogenically produced nitrogen provided that the amount of natural gas or any other hydrocarbon used is more than 6.0 times the stoichiometric amount required for the complete conversion of residual oxygen to a mixture of carbon dioxide and moisture, that the amount is high enough to yield $pCO/pCO_2$ greater than 2.6 and $pH_2/pH_2O$ greater than 1.4 both in the heating and cooling zones, and that the residual oxygen level in both the heating and cooling zones is less than 10 ppm.

EXAMPLE 2-17A

The carbon steel annealing experiment described in Example 2-3 was repeated using the same furnace, samples, flow rate of feed gas, type and location of gas feeding device, and annealing procedure with the exceptions of using 1,000° C. temperature and non-cryogenically produced nitrogen containing 99.70% $N_2$ and 0.30% $O_2$. The amount of natural gas used in this example was approximately 13.3 times the stoichiometric amount required for the conversion of residual oxygen to a mixture of carbon dioxide and moisture.

Steel samples heat treated in accord with this procedure were found to have uniformly bright, oxide-free surfaces. The residual oxygen present in the feed nitrogen was converted almost completely (less than 9 ppm) in the heating and cooling zones to a mixture of carbon monoxide and moisture.

This example showed that a modified porous diffuser located well inside the heating zone of the furnace operated at 1,000° C. can be used to bright, oxide-free anneal carbon steel with non-cryogenically produced nitrogen provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ greater than 2.5 and $pH_2/pH_2O$ greater than 1.5 both in the heating and cooling zones, and that the residual oxygen level in both the heating and cooling zones is less than 10 ppm.

EXAMPLE 2-17B

The carbon steel annealing experiment described in Example 2-17A was repeated using the same furnace, temperature, samples, flow rate and composition of feed gas, type and location of gas feeding device, and annealing procedure with the exception of using 1.5% natural gas. The amount of natural gas used in this example was 10.0 times the stoichiometric amount required for the conversion of residual oxygen to a mixture of carbon dioxide and moisture.

Steel samples heat treated in accord with this procedure were found to have uniformly bright, oxide-free surfaces. The residual oxygen present in the feed nitrogen was converted almost completely (less than 9 ppm) in the heating and cooling zones to a mixture of carbon monoxide and moisture.

This example showed that a modified porous diffuser located well inside the heating zone of the furnace operated at 1,000° C. can be used to bright, and oxide-free anneal carbon steel with non-cryogenically produced nitrogen provided that tile amount of natural gas or any other hydrocarbon used is more than the stoichiometric amount required for the complete conversion of residual oxygen to a mixture of carbon dioxide and moisture, that the amount is high enough to yield $pCO/pCO_2$ greater than 2.5 and $pH_2/pH_2O$ greater than 1.5 both in the heating and cooling zones, and that the residual oxygen level in both the heating and cooling zones is less than 10 ppm.

EXAMPLE 2-17C

The carbon steel annealing experiment described in Example 2-17A was repeated using the same furnace, temperature, samples, flow rate and composition of feed gas, type and location of gas feeding device, and annealing procedure with the exception of using 1.0% natural gas. The amount of natural gas used in this example was 6.7 times the stoichiometric amount required for the conversion of residual oxygen to a mixture of carbon dioxide and moisture.

Steel samples heat treated in accord with this procedure were found to have uniformly bright surfaces. The surface of the samples however had a slight straw color, making the surface finish marginally acceptable. The residual oxygen present in the feed nitrogen was converted almost completely (less than 11 ppm) in the heating and cooling zones to a mixture of carbon monoxide, carbon dioxide, and moisture.

This example showed that a modified porous diffuser located well inside the heating zone of the furnace operated at 1,000° C. can be used to bright, oxide-free anneal carbon steel with non-cryogenically produced nitrogen provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ greater than 2.5 and $pH_2/pH_2O$ greater than 1.5 both in the heating and cooling zones, and that the residual oxygen level in both the heating and cooling zones is less than 10 ppm.

EXAMPLES 2-18 AND 2-19

The carbon steel annealing experiment described in Example 2-17 was repeated two times in Examples 2-18 to 2-19 using the same furnace, samples, flow rate of feed gas, temperature, type and location of gas feeding device, and annealing procedure with the exception of using non-cryogenically produced nitrogen containing 99.75 and 99.80% $N_2$ and 0.25 to 0.20% $O_2$, as shown in Table 2. The amount of natural gas used in these examples was 16.0 and 20.0 times the stoichiometric amount, respectively, required for the conversion of residual oxygen to a mixture of carbon dioxide and moisture.

Steel samples heat treated in these examples were found to have uniformly bright, oxide-free surfaces. The residual oxygen present in the feed nitrogen was converted almost completely (less than 7 ppm) in the heating and cooling zones to a mixture of carbon monoxide and moisture.

These examples showed that a modified porous diffuser located well inside the heating zone of the furnace operated at 1,000° C. can be used to bright, oxide-free anneal carbon steel with non-cryogenically produced nitrogen provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ greater than 2.5 and $pH_2/pH_2O$ greater than 1.5 both in the heating and cooling zones, and that the residual oxygen level in both the heating and cooling zones is less than 10 ppm.

EXAMPLE 2-20

The carbon steel annealing experiment described in Example 2-17 was repeated using the same furnace, samples, flow rate of feed gas, temperature, type and location of gas feeding device, and annealing procedure with the exception of using non-cryogenically produced nitrogen containing 99.85% $N_2$ and 0.15% $O_2$, as shown in Table 2. The amount of natural gas used in this example was approximately 26.7 times the stoichiometric amount required for the conversion of residual oxygen to a mixture of carbon dioxide and moisture.

Steel samples heat treated in these examples were found to have uniformly bright, oxide-free surfaces. The residual oxygen present in the feed nitrogen was converted almost completely (less than 8 ppm) in the heating and cooling zones to a mixture of carbon monoxide and moisture. However both the belt and the inside of the furnace were found to begin sooting slightly, indicating that the process conditions used in this example are not ideal for long term heat treatment. More specifically, the test results revealed that it would be desirable to reduce the amount of natural gas used in the gaseous feed mixture to prevent sooting in the furnace.

This example showed that a modified porous diffuser located well inside the heating zone of the furnace operated at 1,000° C. can be used to bright, oxide-free anneal carbon steel with non-cryogenically produced nitrogen provided that the amount of natural gas or any other hydrocarbon used is more than the stoichiometric amount required for the complete conversion of residual oxygen to a mixture of carbon dioxide and moisture, that the amount is high enough to yield $pCO/pCO_2$ greater than 2.50 and $pH_2/pH_2O$ greater than 1.5 both in the heating and cooling zones, that the amount is not too high to begin sooting inside the furnace, and that the residual oxygen level in both the heating and cooling zones is less than 10 ppm.

EXAMPLE 2-21

The carbon steel annealing experiment described in Example 2-3 was repeated using the same furnace, samples, flow rate of feed gas, type and location of gas feeding device, and annealing procedure with the exceptions of using 950° C. temperature, and non-cryogenically produced nitrogen containing 99.90% $N_2$ and 0.10% $O_2$, as shown in Table 2. The amount of natural gas used tn this example was 40.0 times the stoichiometric amount required for the conversion of residual oxygen to a mixture of carbon dioxide and moisture.

Steel samples heat treated in accord with this procedure were found to have uniformly bright, oxide-free surfaces. The residual oxygen present in the feed nitrogen was converted almost completely (approximately 10 ppm) in the heating and cooling zones to a mixture of carbon monoxide and moisture.

This example showed that a modified porous diffuser located well inside the heating zone of the furnace operated at 950° C. can be used to bright, and oxide-free anneal carbon steel with non-cryogenically produced nitrogen provided that the amount of natural gas used is about 40 times the stoichiometric amount required for the complete conversion of residual oxygen to a mixture of carbon dioxide and moisture, that the amount is high enough to yield $pCO/pCO_2$ greater than 2.4 and $pH_2/pH_2O$ greater than 1.6 both in the heating and cooling zones, and that the residual oxygen level in both the heating and cooling zones is less than 10 ppm.

Examination of incoming material showed neither carburization or decarburization. The steel sample heat treated in the non-cryogenically produced nitrogen atmosphere pre-mixed with natural gas in this example also produced neither decarburization nor carburization. This example therefore showed that non-cryogenically produced nitrogen atmosphere pre-mixed with natural gas can be used for neutral hardening carbon steel by carefully controlling the dew point both in the cooling and heating zones of a continuous furnace.

EXAMPLE 2-22

The carbon steel annealing experiment described in Example 2-21 was repeated using the same furnace, samples, temperature, flow rate of feed gas, type and location of gas feeding device, and annealing procedure with the exceptions of using non-cryogenically produced nitrogen containing 99.925% $N_2$ and 0.075% $O_2$ and adding 1.75% natural gas, as shown in Table 2. The amount of natural gas used in this example was approximately 46.7 times the stoichiometric amount required for the conversion of residual oxygen to a mixture of carbon dioxide and moisture.

Steel samples heat treated in accord with this procedure were found to have uniformly bright, oxide-free surface. The residual oxygen present in the feed nitrogen was converted completely in the heating and cooling zones to a mixture of carbon monoxide and moisture.

This example showed that a modified porous diffuser located well inside the heating zone of the furnace operated at 950° C. can be used to bright, oxide-free anneal carbon steel with non-cryogenically produced nitrogen provided that the amount of natural gas or any other hydrocarbon used is more than 40 times the stoichiometric amount required for the complete conversion of residual oxygen to a mixture of carbon dioxide and moisture, that the amount is high enough to yield $pCO/pCO_2$ greater than 2.4 and $pH_2/pH_2O$ greater than 1.6 both in the heating and cooling zones, and that the residual oxygen level in both the heating and cooling zones is less than 10 ppm.

Examination of incoming material showed neither carburization or decarburization. The steel sample heat treated in the non-cryogenically produced nitrogen atmosphere pre-mixed with natural gas in this example also produced neither decarburization nor carburization. This example therefore showed that non-cryogenically produced nitrogen atmosphere pre-mixed with natural gas can be used for neutral hardening carbon steel by carefully controlling the dew point both in the cooling and heating zones of a continuous furnace.

EXAMPLE 2-23

The carbon steel annealing experiment described in Example 2-21 was repeated using the same furnace, samples, temperature, flow rate of feed gas, type and location of gas feeding device, and annealing procedure with the exceptions of using non-cryogenically produced nitrogen containing 99.95% $N_2$ and 0.05% $O_2$ and adding 1.25% natural gas. The amount of natural gas used In this example was 50 times the stoichiometric amount required for the conversion of residual oxygen to a mixture of carbon dioxide and moisture.

Steel samples heat treated in accord with this procedure were found to have uniformly bright, oxide-free surface. The residual oxygen present in the feed nitrogen was converted completely in the heating and cooling zones to a mixture of carbon monoxide and moisture.

This example showed that a modified porous diffuser located well inside the heating zone of the furnace operated at 950° C. can be used to bright, oxide-free anneal carbon steel with non-cryogenically produced nitrogen provided that the amount of natural gas or any other hydrocarbon used is more than 40 times the stoichiometric amount required for the complete conversion of residual oxygen to a mixture of carbon dioxide and moisture, that the amount is high enough to yield $pCO/pCO_2$ greater than 2.4 and $pH_2/pH_2O$ greater than 1.6 both in the heating and cooling zones, and that the residual oxygen level in both the heating and cooling zones is less than 10 ppm.

Examination of incoming material showed neither carburization or decarburization. The steel sample heat treated in the non-cryogenically produced nitrogen atmosphere pre-mixed with natural gas in this example also produced neither decarburization nor carburization. This example therefore showed that non-cryogenically produced nitrogen atmosphere pre-mixed with natural gas can be used for neutral hardening carbon steel by carefully controlling the dew point both in the cooling and heating zones of a continuous furnace.

A number of additional experiments were conducted at 950° C. temperature to define the operating window for controlled oxide and bright, oxide-free annealing of steel. The results of these experiments are set out in Table 3 and discussed in detail below.

TABLE 3

|  | Example 3-1 | Example 3-2 | Example 3-3A | Example 3-4 |
|---|---|---|---|---|
| Heat Treatment Temperature, °C. | 950 | 950 | 950 | 950 |
| Flow Rate of Feed Gas, SCFH | 350 | 350 | 350 | 350 |
| Feed Gas Location | Heating Zone (Location 76) | Heating Zone (Location 76) | Heating Zone (Location 76) | Heating Zone (Location 76) |
| Type of Feed Device | Modified Porous Diffuser (FIG. 3C) | Modified Porous Diffuser (FIG. 3C) | Modified Porous Diffuser (FIG. 3C) | Modified Porous Diffuser (FIG. 3C) |
| Feed Gas Composition |  |  |  |  |
| Nitrogen, % | 99.50 | 99.50 | 99.50 | 99.75 |
| Oxygen, % | 0.50 | 0.50 | 0.50 | 0.25 |
| Natural Gas* (Methane), % | 0.25 | 1.00 | 3.00 | 0.25 |
| Heating Zone Atmosphere Composition |  |  |  |  |
| Oxygen, ppm | <8 | <6 | <10 | <8 |
| Carbon Monoxide, % | 0.0 | 0.45 | 0.95 | 0.10 |
| Carbon Dioxide, % | 0.17 | 0.17 | 0.00 | 0.05 |
| Hydrogen, % | 0.00 | 1.40 | 3.00 | 0.20 |
| Methane, % | 0.03 | 0.23 | 1.68 | 0.11 |
| Dew Point, °C. | 1.3 | 7.7 | −22.9 | −24.9 |
| Cooling Zone Atmosphere Composition |  |  |  |  |
| Oxygen, ppm | 330 | 190 | 140 | 300 |
| Carbon Monoxide, % | 0.00 | 0.45 | 0.75 | 0.10 |
| Carbon Dioxide, % | 0.20 | 0.03 | 0.02 | 0.06 |
| Hydrogen, % | 0.00 | 1.20 | 3.10 | 0.10 |
| Methane, % | 0.03 | 0.40 | 2.44 | 0.12 |
| Dew Point, °C. | 7.7 | −2.8 | −14.7 | — |
| Quality of Heat Treated Samples | Uniform, Tightly Packed Oxide | Uniform, Tightly Packed Oxide | Mixture of Bright & Oxide | Uniform, Tightly Packed Oxide |

|  | Example 3-5 | Example 3-6 | Example 3-7 | Example 3-8 |
|---|---|---|---|---|
| Heat Treatment Temperature, °C. | 950 | 950 | 950 | 950 |
| Flow Rate of Feed Gas, SCFH | 350 | 350 | 350 | 350 |
| Feed Gas Location | Heating Zone (Location 76) | Heating Zone (Location 76) | Heating Zone (Location 76) | Heating Zone (Location 76) |
| Type of Feed Device | Modified Porous Diffuser (FIG. 3C) | Modified Porous Diffuser (FIG. 3C) | Modified Porous Diffuser (FIG. 3C) | Modified Porous Diffuser (FIG. 3C) |
| Feed Gas Composition |  |  |  |  |
| Nitrogen, % | 99.75 | 99.75 | 99.90 | 99.90 |
| Oxygen, % | 0.25 | 0.25 | 0.10 | 0.10 |
| Natural Gas* (Methane), % | 1.00 | 3.00 | 0.25 | 0.50 |
| Heating Zone Atmosphere Composition |  |  |  |  |
| Oxygen, ppm | <7 | <7 | <6 | <3 |
| Carbon Monoxide, % | 0.50 | — | 0.00 | 0.20 |
| Carbon Dioxide, % | 0.00 | 0.00 | 0.09 | 0.03 |
| Hydrogen, % | 1.50 | 3.00 | 0.10 | 0.65 |
| Methane, % | 0.28 | 1.56 | 0.16 | 0.15 |
| Dew Point, °C. | −30.4 | −32.8 | −12.6 | −18.9 |
| Cooling Zone Atmosphere Composition |  |  |  |  |
| Oxygen, ppm | 140 | 110 | 230 | 110 |
| Carbon Monoxide, % | 0.25 | 0.45 | 0.00 | 0.20 |
| Carbon Dioxide, % | 0.01 | 0.01 | 0.04 | 0.01 |
| Hydrogen, % | 1.10 | 3.40 | 0.10 | 0.55 |
| Methane, % | 0.52 | 2.40 | 0.13 | 0.22 |
| Dew Point, °C. | −15.2 | −28.7 | −12.2 | −23.0 |
| Quality of Heat Treated Samples | Mixture of Bright & Oxide | Mixture of Bright & Oxide | Uniform, Tightly Packed Oxide | Mixture of Bright & Oxide |

*Natural gas was mixed with nitrogen and added as a percent of total non-cryogenically produced nitrogen.

EXAMPLE 3-1

The carbon steel annealing experiment described in Example 2-21 was repeated using the same furnace, temperature, samples, flow rate of feed gas, and annealing procedure with the exceptions of using non-cryogenically produced nitrogen containing 99.5% $N_2$ and 0.5% $O_2$, adding 0.25% natural gas in the gaseous feed mixture, and introducing the gaseous feed mixture into the heating zone of the furnace (Location 76 in FIG. 4) through a modified porous diffuser. A generally cylindrical shaped diffuser 40 shown in FIG. 3C comprising a top half 44 of ⅜ in. diameter, 6 in. long sintered Inconel material with average pore size of 20 microns and open porosity varying from 40-50% supplied by the Mott Metallurgical Corporation was assembled.

Bottom half 46 of diffuser 40 was a gas impervious Inconel with one end 42 of diffuser 40 capped and the other end 43 attached to a ½ in. diameter stainless steel feed tube inserted into the furnace 60 through the cooling end vestibule 68. The bottom half 46 of diffuser 40 was positioned parallel to the parts 16' (prime) being treated thus essentially directing the flow of feed gas towards the hot ceiling of the furnace and preventing the direct impingement of the feed gas with unreacted oxygen on the samples 16'. The amount of natural gas used in this example was equal to the stoichiometric amount required for the conversion of residual oxygen to a mixture of carbon dioxide and moisture.

Steel samples heat treated in accord with this procedure were found to have a uniform, tightly packed oxide layer on the surface. The residual oxygen present in the feed nitrogen was converted in the heating zone to a mixture of carbon dioxide and moisture, as shown in Table 2. The presence low $pCO/pCO_2$ ($<2.4$) and $pH_2/pH_2O$ ($<1.6$) ratios helped in oxidizing the surface of the samples in the heating zone. The surface of the samples was oxidized further in the cooling zone due to the presence of large amount of residual oxygen (see Table 3), resulting in uniform and controlled oxidation of the surface of the samples.

Thus the introduction of non-cryogenically produced nitrogen pre-mixed with the stoichiometric amount of natural gas into a continuous heat treating furnace through a modified porous diffuser located in the heating zone (Location 76) would result in an acceptable process for oxide annealing steel at 950° C.

EXAMPLE 3-2

The carbon steel annealing experiment described in Example 3-1 was repeated using the same furnace, temperature, samples, flow rate and composition of feed gas, type of gas feeding device, and annealing procedure with the exception of adding 1.0% natural gas to the gaseous feed mixture. The amount of natural gas used in this example was 4.0 times the stoichiometric amount required for the conversion of residual oxygen to a mixture of carbon dioxide and moisture.

Steel samples heat treated in accord with this procedure were found to have a uniform, tightly packed oxide layer on the surface. The residual oxygen present in the feed nitrogen was converted almost completely (less than 6 ppm) in the heating zone to a mixture of carbon monoxide, carbon dioxide, and moisture, as shown in Table 3. The presence of low $pH_2/pH_2O$ ($<1.6$) ratio in the heating zone was ideal for oxidizing the surface of the samples. The surface of the samples was oxidized further in the cooling zone due to the presence of large amount of residual oxygen (See Table 3), resulting in uniform and controlled oxidation of the surface of the samples.

Thus the introduction of non-cryogenically produced nitrogen pre-mixed with 4.0 times the stoichiometric amount of natural gas into a continuous heat treating furnace through a modified porous diffuser located in the heating zone (Location 76) would result in an acceptable process for oxide annealing steel at 950° C.

EXAMPLE 3-3A

The carbon steel annealing experiment described in Example 3-1 was repeated using the same furnace, temperature, samples, flow rate and composition of feed gas, type of gas feeding device, and annealing procedure with the exception of adding 3.0% natural gas to the gaseous feed mixture. The amount of natural gas used in this example was 12.0 times the stoichiometric amount required for the conversion of residual oxygen to a mixture of carbon dioxide and moisture.

The surface of steel samples heat treated in accord with this procedure were found to be partially oxidized and partially bright. The residual oxygen present in the feed nitrogen was converted almost completely (less than 10 ppm) in the heating zone to a mixture of carbon monoxide and moisture, as shown in Table 3. The composition of the gas in the heating and cooling zones showed the presence of high $pCO/pCO_2$ ($>2.4$) and $pH_2/pH_2O$ ($>1.6$) ratios both of which are ideal for reducing the surface of the samples. The surface of the samples however was partially oxidized due to the presence of large amount of residual oxygen in the cooling zone (see Table 3).

Thus the introduction of non-cryogenically produced nitrogen pre-mixed with 12.0 times the stoichiometric amount of natural gas into a continuous heat treating furnace through a modified porous diffuser located in the heating zone (Location 76) would result in an unacceptable process for oxide and/or bright annealing steel at 950° C.

EXAMPLE 3-3B

The carbon steel annealing experiment described in Example 3-1 was repeated using the same furnace, temperature, samples, flow rate and composition of feed gas, type of gas feeding device, and annealing procedure with the exception of adding 5.0% natural gas to the gaseous feed mixture. The amount of natural gas used in this example was 20.0 times the stoichiometric amount required for the conversion of residual oxygen to a mixture of carbon dioxide and moisture.

The surface of steel samples heat treated in accord with this procedure were found to be partially oxidized and partially bright. Thus the introduction of non-cryogenically produced nitrogen pre-mixed with 20.0 times the stoichiometric amount of natural gas into a continuous heat treating furnace through a modified porous diffuser located in the heating zone (Location 76) would result in an unacceptable process for oxide and/or bright annealing steel at 950° C.

EXAMPLE 3-4

The carbon steel annealing experiment described in Example 3-1 was repeated using the same furnace, temperature, samples, flow rate of feed gas, amount of natural gas, type of gas feeding device, and annealing procedure with the exception of using non-cryogenically produced nitrogen containing 99.75% $N_2$ and 0.25% $O_2$. The amount of natural gas used in this example was 2.0 times the stoichiometric amount required for the conversion of residual oxygen to a mixture of carbon dioxide and moisture.

Steel samples heat treated in accord with this procedure were found to have a uniform, tightly packed oxide layer on the surface. The residual oxygen present in the feed nitrogen was converted almost completely (less than 8 ppm) in the heating zone to a mixture of carbon monoxide, carbon dioxide, and moisture, as shown in Table 3. The presence of high $pH_2/pH_2O$ ($>1.6$) ratio in the heating zone was ideal for reducing the surface of the samples. However, the surface of the samples was oxidized in the cooling zone due to the presence of low $pCO/pCO_2$ ratio and large amount of residual oxygen (see Table 3), resulting in uniform and controlled oxidation of the surface of the samples.

Thus the introduction of non-cryogenically produced nitrogen pre-mixed with 2.0 times the stoichiometric amount of natural gas into a continuous heat treating furnace through a modified porous diffuser located in the heating zone (Location 76) would result in an acceptable process for oxide annealing steel at 950° C.

EXAMPLE 3-5

The carbon steel annealing experiment described in Example 3-4 was repeated using the same furnace, temperature, samples, flow rate and composition of feed gas, type of gas feeding device, and annealing procedure with the exception of using 1.0% natural gas. The amount of natural gas used in this example was 8.0 times the stoichiometric amount required for the conversion of residual oxygen to a mixture of carbon dioxide and moisture.

The surface of steel samples heat treated in accord with this procedure were found to be partially oxidized and partially bright. Thus the introduction of non-cryogenically produced nitrogen pre-mixed with 8.0 times the stoichiometric amount of natural gas into a continuous heat treating furnace through a modified porous diffuser located in the heating zone (Location 76) would result in an unacceptable process for oxide and/or bright annealing steel at 950° C.

EXAMPLE 3-6

The carbon steel annealing experiment described in Example 3-4 was repeated using the same furnace, temperature, samples, flow rate and composition of feed gas, type of gas feeding device, and annealing procedure with the exception of using 3.0% natural gas. The amount of natural gas used in this example was 24.0 times the stoichiometric amount required for the conversion of residual oxygen to a mixture of carbon dioxide and moisture.

Steel samples heat treated in accord with this procedure were found to be partially oxidized and partially bright. Thus the introduction of non-cryogenically produced nitrogen pre-mixed with 24.0 times the stoichiometric amount of natural gas into a continuous heat treating furnace through a modified porous diffuser located in the heating zone (Location 76) would result in an unacceptable process for oxide and/or bright annealing steel at 950° C.

EXAMPLE 3-7

The carbon steel annealing experiment described in Example 3-4 was repeated using the same furnace, temperature, samples, flow rate of feed gas, amount of natural gas, type of gas feeding device, and annealing procedure with the exception of using non-cryogenically produced nitrogen containing 99.9% $N_2$ and 0.1% $O_2$. The amount of natural gas used in this example was 5.0 times the stoichiometric amount required for the conversion of residual oxygen to a mixture of carbon dioxide and moisture.

Steel samples heat treated in accord with this procedure were found to have a uniform, tightly packed oxide layer on the surface. The residual oxygen present in the feed nitrogen was converted almost completely (less than 6 ppm) in the heating zone to a mixture of carbon dioxide and moisture. The presence of low $pCO/pCO_2$ (<2.4) and $pH_2/pH_2O$ (<1.6) ratios in the heating and cooling zones and the presence of large amount of residual oxygen in the cooling zone were ideal for oxidizing the surface of the samples (see Table 3).

Thus the introduction of non-cryogenically produced nitrogen pre-mixed with 5.0 times the stoichiometric amount of natural gas into a continuous heat treating furnace through a modified porous diffuser located in the heating zone (Location 76) would result in an acceptable process for oxide annealing steel at 950° C.

EXAMPLE 3-8

The carbon steel annealing experiment described in Example 3-7 was repeated using the same furnace, temperature, samples, flow rate and composition of feed gas, type of gas feeding device, and annealing procedure with the exception of using 0.50% natural gas. The amount of natural gas used in this example was 10.0 times the stoichiometric amount required for the conversion of residual oxygen to a mixture of carbon dioxide and moisture.

Steel samples heat treated in accord with this procedure were found to be partially oxidized and partially bright surface. Thus the introduction of non-cryogenically produced nitrogen pre-mixed with 10.0 times the stoichiometric amount of natural gas into a continuous heat treating furnace through a modified porous diffuser located in the heating zone (Location 76) would result in an unacceptable process for oxide and/or bright annealing steel at 950° C.

The Examples 2-1 to 2-7 showed that non-cryogenically produced nitrogen could be used to bright anneal steel at 1,100° C. temperature provided that more than about 5.0 times the stoichiometric amount of natural gas required for the conversion of residual oxygen to a mixture of carbon dioxide and moisture was used and that a modified diffuser was used to introduce the gaseous feed mixture in the heating zone of the furnace. Likewise, the Examples 2-8 to 2-23 showed that non-cryogenically produced nitrogen could be used to bright anneal steel at 1,050° C., 1,000° C., and 950° C. temperatures provided that about 6.0, 13.0, and 40.0 times, respectively, the stoichiometric amount of natural gas required for the conversion of residual oxygen to a mixture of carbon dioxide and moisture was used. The above examples showed that the absolute amount of natural gas required for bright annealing steel increased with the increase in the level of residual oxygen in the feed nitrogen. Additionally, the absolute amount of natural gas required for bright annealing steel decreased with an increase in the heat treatment temperature.

The results of Examples 3-1 to 3-8 showed that a non-cryogenically produced nitrogen can be used to oxide anneal steel at 950° C. provided that the amount of natural gas added to the feed nitrogen is between 1.0 to about 7.0 times the stoichiometric amount required for the conversion of residual oxygen present in the feed nitrogen to a mixture of carbon dioxide and moisture. The results also showed that the addition of 8.0 to 24.0 times the stoichiometric amount of natural gas results in undesirable partially oxidized and partially bright surface.

Figure 8:
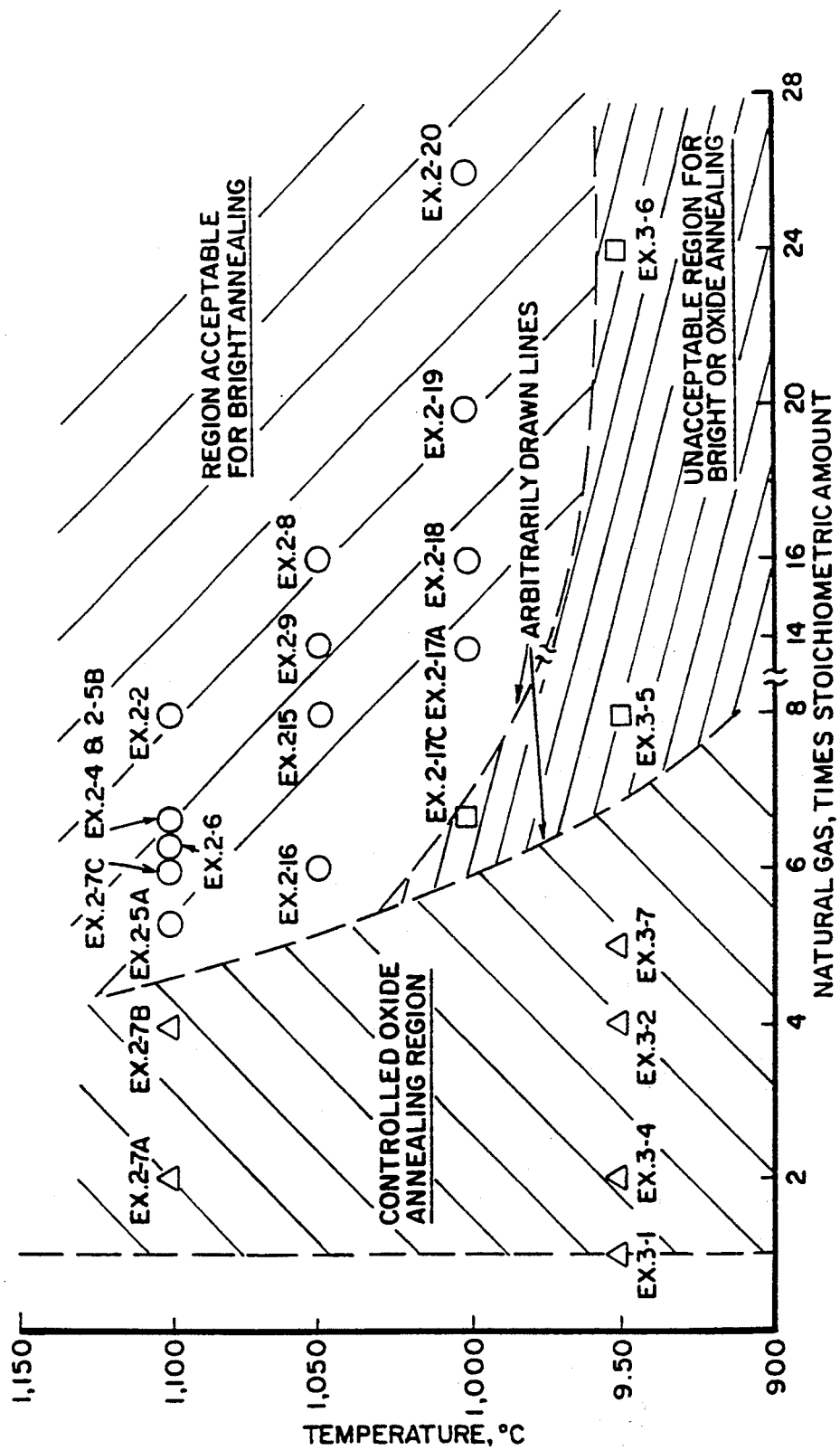
FIG. 8 is a plot of annealing temperature against natural gas requirement for annealing carbon steel according to the invention.

The examples 2-1 to 2-23 and 3-1 to 3-8 relate to annealing using a modified porous diffuser or modified gas feed device to show that carbon steel can be annealed at temperatures ranging from 950° C. to 1,100° C. with non-cryogenically produced nitrogen provided more than stoichiometric amount of natural gas is added to the feed gas. The process of the present invention employing a method of introducing the feed gas into the furnace (e.g. using a modified porous diffuser) enables a user to perform oxide annealing and bright, oxide-free annealing of carbon steel, as shown in FIG. 8. The operating regions shown in FIG. 8 are considerably broader using the process of the present invention than those noted with conventional gas feed device, as is evident by comparing FIGS. 7 and 8. The above experiments therefore demonstrate the importance of preventing the impingement of feed gas with unreacted oxygen on the parts.

A number of carbon steel heat treating experiments were carried out using a mixture of non-cryogenically produced nitrogen and propane. The results of these experiments are set out in Table 4 and discussed in detail below.

TABLE 4

|  | Example 4-1 | Example 4-2 | Example 4-3 | Example 4-4 | Example 4-5 | Example 4-6 |
|---|---|---|---|---|---|---|
| Heat Treatment Temperature, °C. | 1,100 | 1,100 | 1,100 | 1,100 | 1,100 | 1,100 |
| Flow Rate of Feed Gas, SCFH | 350 | 350 | 350 | 350 | 350 | 350 |
| Feed Gas Location | Heating Zone (Location 76) | Heating Zone (Location 76) | Heating Zone (Location 76) | Heating Zone (Location 76) | Heating Zone (Location 76) | Heating Zone (Location 76) |
| Type of Feed Device | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) |
| Feed Gas Composition | | | | | | |
| Nitrogen, % | 99.50 | 99.30 | 99.00 | 99.00 | 99.00 | 99.00 |
| Oxygen, % | 0.50 | 0.70 | 1.00 | 1.00 | 1.00 | 1.00 |
| Propane, % | 0.20 | 0.20 | 0.20 | 0.25 | 0.28 | 0.40 |
| Heating Zone Atmosphere Composition | | | | | | |
| Oxygen, ppm | <5 | <10 | <4 | <5 | <4 | <3 |
| Carbon Monoxide, % | 0.55 | 0.45 | 0.20 | 0.45 | 0.65 | 0.95 |
| Carbon Dioxide, % | 0.00 | 0.08 | 0.34 | 0.24 | 0.18 | 0.11 |
| Hydrogen, % | 1.00 | 0.70 | 0.40 | 0.06 | 0.95 | 1.50 |
| Propane, % | 0.02 | 0.01 | 0.00 | 0.00 | 0.01 | 0.05 |
| Dew Point, °C. | −58.3 | −10.0 | 5.0 | 5.0 | 0.5 | −4.3 |
| Cooling Zone Atmosphere Composition | | | | | | |
| Oxygen, ppm | <6 | <8 | <4 | <5 | <5 | <4 |
| Carbon Monoxide, % | 0.50 | 0.40 | 0.15 | 0.40 | 0.60 | 0.90 |
| Carbon Dioxide, % | 0.00 | 0.09 | 0.35 | 0.25 | 0.18 | 0.12 |
| Hydrogen, % | 0.90 | 0.65 | 0.30 | 0.60 | 0.90 | 1.40 |
| Propane, % | 0.02 | 0.01 | 0.00 | 0.00 | 0.01 | 0.05 |
| Dew Point, °C. | −58.3 | −10.0 | 5.0 | 5.0 | 0.50 | −4.3 |
| Quality of Heat Treated Samples | Uniform Bright | Uniform Bright | Uniform, Tightly Packed Oxide | Uniform, Tightly Packed Oxide | Uniform, Tightly Packed Oxide | Uniform Bright |

|  | Example 4-7 | Example 4-8 | Example 4-9 | Example 4-10 | Example 4-11 | Example 4-12 |
|---|---|---|---|---|---|---|
| Heat Treatment Temperature, °C. | 1,050 | 1,050 | 1,050 | 1,050 | 1,050 | 1,050 |
| Flow Rate of Feed Gas, SCFH | 350 | 350 | 350 | 350 | 350 | 350 |
| Feed Gas Location | Heating Zone (Location 76) | Heating Zone (Location 76) | Heating Zone (Location 76) | Heating Zone (Location 76) | Heating Zone (Location 76) | Heating Zone (Location 76) |
| Type of Feed Device | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) |
| Feed Gas Composition | | | | | | |
| Nitrogen, % | 99.50 | 99.25 | 99.25 | 99.00 | 99.00 | 99.00 |
| Oxygen, % | 0.50 | 0.75 | 0.75 | 1.00 | 1.00 | 1.00 |
| Propane, % | 0.20 | 0.20 | 0.25 | 0.25 | 0.28 | 0.40 |
| Heating Zone Atmosphere Composition | | | | | | |
| Oxygen, ppm | <5 | <4 | <4 | <4 | <4 | <5 |
| Carbon Monoxide, % | 0.30 | 0.20 | 0.40 | 0.25 | 0.45 | 0.80 |
| Carbon Dioxide, % | 0.05 | 0.18 | 0.12 | 0.29 | 0.22 | 0.14 |
| Hydrogen, % | 0.75 | 0.40 | 0.80 | 0.50 | 0.80 | 1.40 |
| Propane, % | 0.05 | 0.00 | 0.01 | 0.00 | 0.01 | 0.04 |
| Dew Point, °C. | −13.0 | −2.2 | −4.1 | 6.0 | 6.1 | −4.2 |
| Cooling Zone Atmosphere Composition | | | | | | |
| Oxygen, ppm | <7 | <4 | <5 | <4 | <5 | <5 |
| Carbon Monoxide, % | 0.30 | 0.20 | 0.40 | 0.25 | 0.45 | 0.80 |
| Carbon Dioxide, % | 0.05 | 0.19 | 0.12 | 0.29 | 0.22 | 0.14 |
| Hydrogen, % | 0.70 | 0.40 | 0.75 | 0.45 | 0.80 | 1.40 |
| Propane, % | 0.05 | 0.00 | 0.01 | 0.00 | 0.01 | 0.04 |
| Dew Point, °C. | −13.0 | −2.2 | −4.1 | 6.0 | 6.0 | −4.1 |
| Quality of Heat Treated Samples | Uniform Bright | Uniform, Tightly Packed Oxide | Uniform Bright | Uniform, Tightly Packed Oxide | Uniform, Tightly Packed Oxide | Uniform Bright |

|  | Example 4-13 | Example 4-14 | Example 4-15 | Example 4-16 | Example 4-17 | Example 4-18 |
|---|---|---|---|---|---|---|
| Heat Treatment Temperature, °C. | 1,000 | 1,000 | 1,000 | 1,000 | 1,000 | 1,000 |
| Flow Rate of Feed Gas, SCFH | 350 | 350 | 350 | 350 | 350 | 350 |
| Feed Gas Location | Heating Zone (Location 76) | Heating Zone (Location 76) | Heating Zone (Location 76) | Heating Zone (Location 76) | Heating Zone (Location 76) | Heating Zone (Location 76) |
| Type of Feed Device | Modified Porous Diffuser | Modified Porous Diffuser | Modified Porous Diffuser | Modified Porous Diffuser | Modified Porous Diffuser | Modified Porous Diffuser |

TABLE 4-continued

|  | (FIG. 3C) | (FIG. 3C) | (FIG. 3C) | (FIG. 3C) | (FIG. 3C) | (FIG. 3C) |
|---|---|---|---|---|---|---|
| Feed Gas Composition |  |  |  |  |  |  |
| Nitrogen, % | 99.50 | 99.50 | 99.25 | 99.25 | 99.25 | 99.25 |
| Oxygen, % | 0.50 | 0.50 | 0.75 | 0.75 | 0.75 | 0.75 |
| Propane, % | 0.20 | 0.25 | 0.20 | 0.25 | 0.28 | 0.32 |
| Heating Zone Atmosphere Composition |  |  |  |  |  |  |
| Oxygen, ppm | <6 | <4 | <5 | <5 | <5 | <4 |
| Carbon Monoxide, % | 0.30 | 0.50 | 0.20 | 0.40 | 0.60 | 0.75 |
| Carbon Dioxide, % | 0.09 | 0.01 | 0.20 | 0.14 | 0.09 | 0.06 |
| Hydrogen, % | 0.70 | 1.10 | 0.45 | 0.80 | 1.10 | 1.45 |
| Propane, % | 0.01 | 0.04 | 0.00 | 0.01 | 0.04 | 0.05 |
| Dew Point, °C. | −9.3 | −35.0 | 0.10 | −1.5 | −6.1 | −15.6 |
| Cooling Zone Atmosphere Composition |  |  |  |  |  |  |
| Oxygen, ppm | <8 | <7 | <5 | <6 | <7 | <7 |
| Carbon Monoxide, % | 0.30 | 0.45 | 0.20 | 0.40 | 0.60 | 0.75 |
| Carbon Dioxide, % | 0.07 | 0.01 | 0.20 | 0.14 | 0.09 | 0.06 |
| Hydrogen, % | 0.70 | 1.05 | 0.40 | 0.80 | 1.10 | 1.40 |
| Propane, % | 0.01 | 0.04 | 0.01 | 0.01 | 0.03 | 0.06 |
| Dew Point, °C. | −9.2 | −35.2 | 0.00 | −1.5 | −6.2 | −15.0 |
| Quality of Heat Treated Samples | Uniform Bright | Uniform Bright | Uniform, Tightly Packed Oxide | Mixture of Bright & Oxide | Uniform Bright | Uniform Bright |

|  | Example 4-19 | Example 4-20 | Example 4-21 | Example 4-22 | Example 4-23 | Example 4-24 |
|---|---|---|---|---|---|---|
| Heat Treatment Temperature, °C. | 1,000 | 1,000 | 1,000 | 950 | 950 | 950 |
| Flow Rate of Feed Gas, SCFH | 350 | 350 | 350 | 350 | 350 | 350 |
| Feed Gas Location | Heating Zone (Location 76) | Heating Zone (Location 76) | Heating Zone (Location 76) | Heating Zone (Location 76) | Heating Zone (Location 76) | Heating Zone (Location 76) |
| Type of Feed Device | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) |
| Feed Gas Composition |  |  |  |  |  |  |
| Nitrogen, % | 99.00 | 99.00 | 99.00 | 99.50 | 99.50 | 99.50 |
| Oxygen, % | 1.00 | 1.00 | 1.00 | 0.50 | 0.50 | 0.50 |
| Propane, % | 0.28 | 0.40 | 0.55 | 0.20 | 0.25 | 0.32 |
| Heating Zone Atmosphere Composition |  |  |  |  |  |  |
| Oxygen, ppm | <4 | <5 | <4 | <7 | <8 | <6 |
| Carbon Monoxide, % | 0.50 | 0.85 | 1.20 | 0.30 | 0.50 | 0.85 |
| Carbon Dioxide, % | 0.24 | 0.15 | 0.07 | 0.09 | 0.03 | 0.00 |
| Hydrogen, % | 0.80 | 1.40 | 2.00 | 0.65 | 1.00 | 1.70 |
| Propane, % | 0.01 | 0.06 | 0.07 | 0.02 | 0.05 | 0.06 |
| Dew Point, °C. | 5.0 | 1.0 | −9.5 | −6.0 | −26.0 | −58.3 |
| Cooling Zone Atmosphere Composition |  |  |  |  |  |  |
| Oxygen, ppm | <5 | <5 | <8 | 11 | 12 | ~10 |
| Carbon Monoxide, % | 0.50 | 0.80 | 1.15 | 0.30 | 0.50 | 0.80 |
| Carbon Dioxide, % | 0.24 | 0.15 | 0.08 | 0.07 | 0.02 | 0.00 |
| Hydrogen, % | 0.80 | 1.40 | 1.95 | 0.65 | 1.00 | 1.60 |
| Propane, % | 0.01 | 0.05 | 0.10 | 0.02 | 0.05 | 0.07 |
| Dew Point, °C. | 5.1 | 1.5 | −9.6 | −6.5 | −26.2 | −58.3 |
| Quality of Heat Treated Samples | Uniform, Tightly Packed Oxide | Uniform Bright | Uniform Bright | Uniform, Tightly Packed Oxide | Mixture of Oxide & Bright | Uniform Bright |

|  | Example 4-25 | Example 4-26 | Example 4-27 | Example 4-28 | Example 4-29 |
|---|---|---|---|---|---|
| Heat Treatment Temperature, °C. | 950 | 950 | 950 | 900 | 900 |
| Flow Rate of Feed Gas, SCFH | 350 | 350 | 350 | 350 | 350 |
| Feed Gas Location | Heating Zone (Location 76) | Heating Zone (Location 76) | Heating Zone (Location 76) | Heating Zone (Location 76) | Heating Zone (Location 76) |
| Type of Feed Device | Modified Porous Diffuser (FIG. 3C) | Modified Porous Diffuser (FIG. 3C) | Modified Porous Diffuser (FIG. 3C) | Modified Porous Diffuser (FIG. 3C) | Modified Porous Diffuser (FIG. 3C) |
| Feed Gas Composition |  |  |  |  |  |
| Nitrogen, % | 99.25 | 99.25 | 99.25 | 99.50 | 99.50 |
| Oxygen, % | 0.75 | 0.75 | 0.75 | 0.50 | 0.50 |
| Propane, % | 0.32 | 0.55 | 0.63 | 0.20 | 0.28 |
| Heating Zone Atmosphere Composition |  |  |  |  |  |
| Oxygen, ppm | <8 | <6 | <6 | <10 | 11 |
| Carbon Monoxide, % | 0.75 | 1.25 | 1.25 | 0.25 | 0.70 |
| Carbon Dioxide, % | 0.07 | 0.00 | 0.00 | 0.10 | 0.00 |
| Hydrogen, % | 1.35 | 2.20 | 2.30 | 0.60 | 1.30 |
| Propane, % | 0.10 | 0.13 | 0.20 | 0.02 | 0.06 |
| Dew Point, °C. | −15.3 | −58.3 | −58.3 | −9.6 | −35.0 |
| Cooling Zone Atmosphere Composition |  |  |  |  |  |
| Oxygen, ppm | 15 | 12 | 13 | 18 | 18 |
| Carbon Monoxide, % | 0.75 | 1.20 | 1.20 | 0.25 | 0.65 |
| Carbon Dioxide, % | 0.07 | 0.00 | 0.00 | 0.10 | 0.00 |
| Hydrogen, % | 1.35 | 2.10 | 2.20 | 0.60 | 1.25 |
| Propane, % | 0.08 | 0.12 | 0.15 | 0.03 | 0.08 |

TABLE 4-continued

| Dew Point, °C. | −15.6 | −58.0 | −58.9 | −10.0 | −34.5 |
|---|---|---|---|---|---|
| Quality of Heat Treated Samples | Mixture of Bright & Oxide | Uniform Bright With Slight Straw Color | Uniform Bright With Slight Straw Color | Non-Uniform Oxide | Mixture of Bright & Oxide |

*Propane was mixed with nitrogen and added as a percent of total non-cryogenically produced nitrogen.

EXAMPLE 4-1

The carbon steel annealing experiment described in Example 2-3 was repeated using the same furnace, temperature, samples, flow rate and composition of feed gas, type and location of gas feeding device, and annealing procedure with the exception of using 0.2% propane instead of 2.0% natural gas. The amount of propane used in this example was 2.0 times the stoichiometric amount required for the conversion of residual oxygen to a mixture of carbon dioxide and moisture.

Steel samples heat treated in accord with this procedure were found to have uniformly bright, oxide-free surfaces. The residual oxygen present in the feed nitrogen was converted almost completely (less than 6 ppm) in the heating and cooling zones to a mixture of carbon monoxide and moisture, as shown in Table 4. The presence of high $pCO/pCO_2$ (>2.8) and $pH_2/pH_2O$ (>1.3) ratios in both the heating and cooling zones resulted in reducing the surface of the samples.

This example showed that the introduction of non-cryogenically produced nitrogen into the heating zone through a modified porous diffuser at 1,100° C. would result in uniform bright, oxide-free samples provided that the amount of propane or any other hydrocarbon used is more than the stoichiometric amount required for the complete conversion of residual oxygen to a mixture of carbon dioxide and moisture, that the amount is high enough to yield $pCO/pCO_2$ greater than 2.8 and $pH_2/pH_2O$ greater than 1.3 both in the heating and cooling zones, and that the residual oxygen level in both the heating and cooling zones is less than 10 ppm.

Examination of incoming material showed neither carburization or decarburization while the steel sample heat treated in the non-cryogenically produced nitrogen atmosphere pre-mixed with propane in this example produced marginal decarburization—the depth of decarburization was approximately 0.0038 inches.

EXAMPLE 4-2

The carbon steel annealing experiment described in Example 4-1 was repeated using the same furnace, temperature, samples, flow rate of feed gas, type and location of gas feeding device, amount of propane, and annealing procedure with the exception of using a non-cryogenically produced nitrogen containing 99.3% $N_2$ and 0.7% $O_2$. The amount of propane used in this example was approximately 1.5 times the stoichiometric amount required for the conversion of residual oxygen to a mixture of carbon dioxide and moisture.

Steel samples heat treated in accord with this procedure were found to have uniformly bright, oxide-free surfaces. The residual oxygen present in the feed nitrogen was converted almost completely (less than 10 ppm) in the heating and cooling zones to a mixture of carbon monoxide, carbon dioxide, and moisture, as shown in Table 4. The presence of high $pCO/pCO_2$ (>2.8) and $pH_2/pH_2O$ (>1.3) ratios in both the heating and cooling zones resulted in reducing the surface of the samples.

This example showed that the introduction of non-cryogenically produced nitrogen into the heating zone through a modified porous diffuser at 1,100° C. would result in uniform bright, oxide-free samples provided that the amount of propane or any other hydrocarbon used is more than the stoichiometric amount required for the complete conversion of residual oxygen to a mixture of carbon dioxide and moisture, that the amount is high enough to yield $pCO/pCO_2$ greater than 2.8 and $pH_2/pH_2O$ greater than 1.3 both in the heating and cooling zones, and that the residual oxygen level in both the heating and cooling zones is less than 10 ppm.

EXAMPLE 4-3

The carbon steel annealing experiment described in Example 4-1 was repeated using the same furnace, temperature, samples, flow rate of feed gas, type and location of gas feeding device, amount of propane, and annealing procedure with the exception of using a non-cryogenically produced nitrogen containing 99.0% $N_2$ and 1.0% $O_2$. The amount of propane used in this example was equal to the stoichiometric amount required for the conversion of residual oxygen to a mixture of carbon dioxide and moisture.

Steel samples heat treated in accord with this procedure were found to have uniform, tightly packed oxide layer on the surface. The residual oxygen present in the feed nitrogen was converted in the heating and cooling zones to a mixture of carbon dioxide, carbon monoxide, and moisture. The presence of low $pCO/pCO_2$ (<2.8) and $pH_2/pH_2O$ (<1.3) ratios both in the heating and cooling zones resulted in oxidizing the samples (see Table 4).

Thus the introduction of non-cryogenically produced nitrogen pre-mixed with the stoichiometric amount of propane into a continuous heat treating furnace through a modified porous diffuser located in the heating zone would result in an acceptable process for controlled oxide annealing steel at 1,100° C.

EXAMPLE 4-4

The carbon steel annealing experiment described in Example 4-3 was repeated using the same furnace, temperature, samples, flow rate and composition of feed gas, type and location of gas feeding device, and annealing procedure with the exception of using 0.25% propane instead of 0.2%, as shown in Table 4. The amount of propane used in this example was 1.25 times the stoichiometric amount required for the conversion of residual oxygen to a mixture of carbon dioxide and moisture.

Steel samples heat treated in accord with this procedure were found to have uniform, tightly packed oxide layers on the surface. The presence of low $pCO/pCO_2$ (<2.8) and $pH_2/pH_2O$ (<1.3) ratios both in the heating and cooling zones resulted in oxidizing the samples (see Table 4).

Thus the introduction of non-cryogenically produced nitrogen pre-mixed with 1.25 times the stoichiometric amount of propane into a continuous heat treating furnace through a modified porous diffuser located in the heating zone would result in an acceptable process for controlled oxide annealing steel at 1,100° C.

EXAMPLE 4-5

The carbon steel annealing experiment described in Example 4-3 was repeated using the same furnace, temperature, samples, flow rate and composition of feed gas, type and location of gas feeding device, and annealing procedure with the exception of using 0.28% propane instead of 0.2%, as shown in Table 4. The amount of propane used in this example was 1.40 times the stoichiometric amount required for the conversion of residual oxygen to a mixture of carbon dioxide and moisture.

Steel samples heat treated in accord with this procedure once again were found to have uniform, tightly packed oxide layers on the surface. The presence of low $pCO/pCO_2$ ($<2.8$) and $pH_2/pH_2O$ ($<1.3$) ratios both in the heating and cooling zones resulted in oxidizing the samples (see Table 4).

Thus the introduction of non-cryogenically produced nitrogen pre-mixed with 1.40 times the stoichiometric amount of propane into a continuous heat treating furnace through a modified porous diffuser located in the heating zone would result in an acceptable process for controlled oxide annealing steel at 1,100° C.

EXAMPLE 4-6

The carbon steel annealing experiment described in Example 4-3 was repeated using the same furnace, temperature, samples, flow rate and composition of feed gas, type and location of gas feeding device, and annealing procedure with the exception of using 0.40% propane instead of 0.2%, as shown in Table 4. The amount of propane used in this example was 2.0 times the stoichiometric amount required for the conversion of residual oxygen to a mixture of carbon dioxide and moisture.

Steel samples heat treated in accord with this procedure were found to have uniformly bright, oxide-free surfaces. The residual oxygen present in the feed nitrogen was converted almost completely (less than 4 ppm) in the heating and cooling zones to a mixture of carbon monoxide, carbon dioxide, and moisture, as shown in Table 4. The presence of high $pCO/pCO_2$ ($>2.8$) and $pH_2/pH_2O$ ($>1.3$) ratios in both the heating and cooling zones resulted in reducing the surface of the samples.

This example showed that the introduction of non-cryogenically produced nitrogen into the heating zone through a modified porous diffuser at 1,100° C. would result in uniform bright, oxide-free samples provided that the amount of propane or any other hydrocarbon used is more than the stoichiometric amount required for the complete conversion of residual oxygen to a mixture of carbon dioxide and moisture, that the amount is high enough to yield $pCO/pCO_2$ greater than 2.8 and $pH_2/pH_2O$ greater than 1.3 both in the heating and cooling zones, and that the residual oxygen level in both the heating and cooling zones is less than 10 ppm.

Examination of incoming material showed neither carburization or decarburization while the steel sample heat treated in the non-cryogenically produced nitrogen atmosphere pre-mixed with propane in this example produced decarburization of approximately 0.0055 inches.

EXAMPLE 4-7

The carbon steel annealing experiment described in Example 4-1 was repeated using the same furnace, samples, flow rate and composition of feed gas, type and location of gas feeding-device, and annealing procedure with the exception of using 1,050° C. temperature instead of 1,100° C. The amount of propane used in this example was 2.0 times the stoichiometric amount required for the conversion of residual oxygen to a mixture of carbon dioxide and moisture.

Steel samples heat treated in accord with this procedure were found to have uniformly bright, oxide-free surfaces. The residual oxygen present in the feed nitrogen was converted almost completely (less than 7 ppm) in the heating and cooling zones to a mixture of carbon monoxide, carbon dioxide, and moisture, as shown in Table 4. The presence of high $pCO/pCO_2$ ($>2.6$) and $pH_2/pH_2O$ ($>1.4$) ratios in both the heating and cooling zones resulted in reducing the surface of the samples.

This example showed that the introduction of non-cryogenically produced nitrogen into the heating zone through a modified porous diffuser at 1,050° C. would result in uniform bright, oxide-free samples provided that the amount of propane or any other hydrocarbon used is more than the stoichiometric amount required for the complete conversion of residual oxygen to a mixture of carbon dioxide and moisture, that the amount is high enough to yield $pCO/pCO_2$ greater than 2.6 and $pH_2/pH_2O$ greater than 1.4 both in the heating and cooling zones, and that the residual oxygen level in both the heating and cooling zones is less than 10 ppm.

EXAMPLE 4-8

The carbon steel annealing experiment described in Example 4-7 was repeated using the same furnace, temperature, samples, flow rate of feed gas, type and location of gas feeding device, amount of propane, and annealing procedure with the exception of using a non-cryogenically produced nitrogen containing 99.25% $N_2$ and 0.75% $O_2$. The amount of propane used in this example was 1.33 times the stoichiometric amount required for the conversion of residual oxygen to a mixture of carbon dioxide and moisture.

Steel samples heat treated in accord with this procedure were found to have uniform, tightly packed oxide layers on the surface. The residual oxygen present in the feed nitrogen was converted in the heating and cooling zones to a mixture of carbon dioxide, carbon monoxide, and moisture. The presence of low $pCO/pCO_2$ ($<2.6$) and $pH_2/pH_2O$ ($<1.4$) ratios both in the heating and cooling zones resulted in oxidizing the samples (see Table 4).

Thus the introduction of non-cryogenically produced nitrogen pre-mixed with 1.33 times the stoichiometric amount of propane into a continuous heat treating furnace through a modified porous diffuser located in the heating zone would result in an acceptable process for controlled oxide annealing steel at 1,050° C.

EXAMPLE 4-9

The carbon steel annealing experiment described in Example 4-8 was repeated using the same furnace, temperature, samples, flow rate and composition of feed gas, type and location of gas feeding device, and annealing procedure with the exception of using 0.25% propane instead of 0.2%, as shown in Table 4. The amount of propane used in this example was approximately 1.7 times the stoichiometric amount required for the conversion of residual oxygen to a mixture of carbon dioxide and moisture.

Steel samples heat treated in accord with this procedure were found to have a uniformly bright, oxide-free surface. The residual oxygen present in the feed nitrogen was converted almost completely (less than 5 ppm) in the heating and cooling zones to a mixture of carbon monoxide, carbon dioxide, and moisture, as shown in Table 4. The presence of high $pCO/pCO_2$ ($>2.6$) and $pH_2/pH_2O$ ($>1.4$) ratios in both the heating and cooling zones resulted in reducing the surface of the samples.

This example showed that the introduction of non-cryogenically produced nitrogen into the heating zone through a modified porous diffuser at 1,050° C. would result in uniform bright, oxide-free samples provided that the amount of propane or any other hydrocarbon used is more than the stoichiometric amount required for the complete conversion of residual oxygen to a mixture of carbon dioxide and moisture, that the amount is high enough to yield $pCO/pCO_2$ greater than 2.6 and $pH_2/pH_2O$ greater than 1.4 both in the heating and cooling zones, and that the residual oxygen level in both the heating and cooling zones is less than 10 ppm.

EXAMPLE 4-10

The carbon steel annealing experiment described in Example 4-9 was repeated using the same furnace, temperature, samples, flow rate of feed gas, type and location of gas feeding device, amount of propane, and annealing procedure with the exception of using a non-cryogenically produced nitrogen containing 99.0% $N_2$ and 1.0% $O_2$, as shown in Table 4. The amount of propane used in this example was equal to 1.25 times the stoichiometric amount required for the conversion of residual oxygen to a mixture of carbon dioxide and moisture.

Steel samples heat treated in accord with this procedure were found to have a uniform, tightly packed oxide layer on the surface. The residual oxygen present in the feed nitrogen was converted in the heating and cooling zones to a mixture of carbon dioxide, carbon monoxide, and moisture. The presence of low $pCO/pCO_2$ ($<2.6$) and $pH_2/pH_2O$ ($<1.4$) ratios both in the heating and cooling zones resulted in oxidizing the samples (see Table 4).

Thus the introduction of non-cryogenically produced nitrogen pre-mixed with 1.25 times the stoichiometric amount of propane into a continuous heat treating furnace through a modified porous diffuser located in the heating zone would result in an acceptable process for controlled oxide annealing steel at 1,050° C.

EXAMPLE 4-11

The carbon steel annealing experiment described in Example 4-10 was repeated using the same furnace, temperature, samples, flow rate and composition of feed gas, type and location of gas feeding device, and annealing procedure with the exception of using 0.28% propane instead of 0.25%, as shown in Table 4. The amount of propane used in this example was equal to 1.40 times the stoichiometric amount required for the conversion of residual oxygen to a mixture of carbon dioxide and moisture.

Steel samples heat treated in accord with this procedure were found to have a uniform, tightly packed oxide layer on the surface. Thus the introduction of non-cryogenically produced nitrogen pre-mixed with 1.40 times the stoichiometric amount of propane into a continuous heat treating furnace through a modified porous diffuser located in the heating zone would result in an acceptable process for controlled oxide annealing steel at 1,050° C.

EXAMPLE 4-12

The carbon steel annealing experiment described in Example 4-10 was repeated using the same furnace, temperature, samples, flow rate and composition of feed gas, type and location of gas feeding device, and annealing procedure with the exception of using 0.40% propane instead of 0.25%, as shown in Table 4. The amount of propane used in this example was equal to 2.0 times the stoichiometric amount required for the conversion of residual oxygen to a mixture of carbon dioxide and moisture.

Steel samples heat treated in accord with this procedure were found to have a uniformly bright, oxide-free surface. The residual oxygen present in the feed nitrogen was converted almost completely (less than 5 ppm) in the heating and cooling zones to a mixture of carbon monoxide, carbon dioxide, and moisture, as shown in Table 4. The presence of high $pCO/pCO_2$ ($>2.6$) and $pH_2/pH_2O$ ($>1.4$) ratios in both the heating and cooling zones resulted in reducing the surface of the samples.

This example showed that the introduction of non-cryogenically produced nitrogen into the heating zone through a modified porous diffuser at 1,050° C. would result in uniform bright, oxide-free samples provided that the amount of propane or any other hydrocarbon used is more than the stoichiometric amount required for the complete conversion of residual oxygen to a mixture of carbon dioxide and moisture, that the amount is high enough to yield $pCO/pCO_2$ greater than 2.6 and $pH_2/pH_2O$ greater than 1.4 both in the heating and cooling zones, and that the residual oxygen level in both the heating and cooling zones is less than 10 ppm.

EXAMPLE 4-13

The carbon steel annealing experiment described in Example 4-1 was repeated using the same furnace, samples, flow rate and composition of feed gas, type and location of gas feeding device, and annealing procedure with the exception of using 1,000° C. temperature instead of 1,100° C., as shown in Table 4. The amount of propane used in this example was 2.0 times the stoichiometric amount required for the conversion of residual oxygen to a mixture of carbon dioxide and moisture.

Steel samples heat treated in accord with this procedure were found to have a uniformly bright, oxide-free surface. The residual oxygen present in the feed nitrogen was converted almost completely (less than 7 ppm) in the heating and cooling zones to a mixture of carbon monoxide, carbon dioxide, and moisture, as shown in Table 4. The presence of high $pCO/pCO_2$ ($>2.5$) and $pH_2/pH_2O$ ($>1.5$) ratios in both the heating and cooling zones resulted in reducing the surface of the samples.

This example showed that the introduction of non-cryogenically produced nitrogen into the heating zone through a modified porous diffuser at 1,000° C. would result in uniform bright, oxide-free samples provided that the amount of propane or any other hydrocarbon used is more than the stoichiometric amount required for the complete conversion of residual oxygen to a mixture of carbon dioxide and moisture, that the amount is high enough to yield $pCO/pCO_2$ greater than 2.5 and $pH_2/pH_2O$ greater than 1.5 both in the heating and cooling zones, and that the residual oxygen level in both the heating and cooling zones is less than 10 ppm.

EXAMPLE 4-14

The carbon steel annealing experiment described in Example 4-13 was repeated using the same furnace, temperature, samples, flow rate and composition of feed gas, type and location of gas feeding device, and annealing procedure with the exception of using 0.25% propane instead of 0.20%, as shown in Table 4. The amount of propane used in this example was 2.5 times the stoichiometric amount required for the conversion of residual oxygen to a mixture of carbon dioxide and moisture.

Steel samples heat treated in accord with this procedure were found to have a uniformly bright, oxide-free surface. Thus the introduction of non-cryogenically produced nitrogen into the heating zone through a modified porous diffuser at 1,000° C. would result in uniform bright, oxide-free samples provided that the amount of propane or any other hydrocarbon used is more than the stoichiometric amount required for the complete conversion of residual oxygen to a mixture of carbon dioxide and moisture, that the amount is high enough to yield $pCO/pCO_2$ greater than 2.5 and $pH_2/pH_2O$ greater than 1.5 both in the heating and cooling zones, and that the residual oxygen level in both the heating and cooling zones is less than 10 ppm.

EXAMPLE 4-15

The carbon steel annealing experiment described in Example 4-13 was repeated using the same furnace, temperature, samples, flow rate of feed gas, type and location of gas feeding device, amount of propane, and annealing procedure with the exception of using a non-cryogenically produced nitrogen containing 99.25% $N_2$ and 0.75% $O_2$. The amount of propane used in this example was 1.33 times the stoichiometric amount required for the conversion of residual oxygen to a mixture of carbon dioxide and moisture.

Steel samples heat treated in accord with this procedure were found to have a uniform, tightly packed oxide layer on the surface. The residual oxygen present in the feed nitrogen was converted in the heating and cooling zones to a mixture of carbon dioxide, carbon monoxide, and moisture. The presence of low $pCO/pCO_2$ (<2.5) and $pH_2/pH_2O$ (<1.5) ratios both in the heating and cooling zones resulted in oxidizing the samples (see Table 4).

Thus the introduction of non-cryogenically produced nitrogen pre-mixed with 1.33 times the stoichiometric amount of propane into a continuous heat treating furnace through a modified porous diffuser located in the heating zone would result in an acceptable process for controlled oxide annealing steel at 1,000° C.

EXAMPLE 4-16

The carbon steel annealing experiment described in Example 4-15 was repeated using the same furnace, temperature, samples, flow rate and composition of feed gas, type and location of gas feeding device, and annealing procedure with the exception of using 0.25% propane instead of 0.20%, as shown in Table 4. The amount of propane used in this example was equal to 1.67 times the stoichiometric amount required for the conversion of residual oxygen to a mixture of carbon dioxide and moisture.

Steel samples heat treated in accord with this procedure were found to have a surface finish that was partly bright and partly oxidized. The residual oxygen present in the feed nitrogen was converted in the heating and cooling zones to a mixture of carbon dioxide, carbon monoxide, and moisture. The presence of high $pCO/pCO_2$ (>2.5) ratio both in the heating and cooling zones was possibly responsible for reducing the sample. However, the presence of $pH_2/pH_2O$ ratio close to 1.5 both in the heating and cooling zones resulted in partially oxidizing the samples (see Table 4).

Thus the introduction of non-cryogenically produced nitrogen-pre-mixed with 1.67 times the stoichiometric amount of propane into a continuous heat treating furnace through a modified porous diffuser located in the heating zone would not result in an acceptable process for oxide or bright annealing steel at 1,000° C.

EXAMPLE 4-17

The carbon steel annealing experiment described in Example 4-15 was repeated using the same furnace, temperature, samples, flow rate and composition of feed gas, type and location of gas feeding device, and annealing procedure with the exception of using 0.28% propane instead of 0.20%, as shown in Table 4. The amount of propane used in this example was equal to 1.87 times the stoichiometric amount required for the conversion of residual oxygen to a mixture of carbon dioxide and moisture.

Steel samples heat treated in accord with this procedure were found to have a uniformly bright, oxide-free surface. The residual oxygen present in the feed nitrogen was converted almost completely (less than 7 ppm) in the heating and cooling zones to a mixture of carbon monoxide, carbon dioxide, and moisture, as shown in Table 4. The presence of high $pCO/pCO_2$ (>2.5) and $pH_2/pH_2O$ (>1.5) ratios in both the heating and cooling zones resulted in reducing the surface of the samples.

This example showed that the introduction of non-cryogenically produced nitrogen into the heating zone through a modified porous diffuser at 1,000° C. would result in uniform bright, oxide-free samples provided that the amount of propane or any other hydrocarbon used is more than the stoichiometric amount required for the complete conversion of residual oxygen to a mixture of carbon dioxide and moisture, that the amount is high enough to yield $pCO/pCO_2$ greater than 2.5 and $pH_2/pH_2O$ greater than 1.5 both in the heating and cooling zones, and that the residual oxygen level in both the heating and cooling zones is less than 10 ppm.

EXAMPLE 4-18

The carbon steel annealing experiment described in Example 4-15 was repeated using the same furnace, temperature, samples, flow rate and composition of feed gas, type and location of gas feeding device, and annealing procedure with the exception of using 0.32% propane instead of 0.20%, as shown in Table 4. The amount of propane used in this example was equal to approximately 2.1 times the stoichiometric amount required for the conversion of residual oxygen to a mixture of carbon dioxide and moisture.

Steel samples heat treated in accord with this procedure were found to have uniformly bright, oxide-free surface. Thus the introduction of non-cryogenically produced nitrogen into the heating zone through a modified porous diffuser at 1,000° C. would result in uniform bright, oxide-free samples provided that the amount of propane or any other hydrocarbon used is more than the stoichiometric amount required for the complete conversion of residual oxygen to a mixture of carbon dioxide and moisture, that the amount is high enough to yield $pCO/pCO_2$ greater than 2.5 and $pH_2/pH_2O$ greater than 1.5 both in the heating and cooling zones, and that the residual oxygen level in both the heating and cooling zones is less than 10 ppm.

EXAMPLE 4-19

The carbon steel annealing experiment described in Example 4-17 was repeated using the same furnace, temperature, samples, flow rate of feed gas, type and location of gas feeding device, amount of propane, and annealing procedure with the exception of using a non-cryogenically produced nitrogen containing 99.0% $N_2$ and 1.0% $O_2$, as shown in Table 4. The amount of propane used in this example was 1.4 times the stoichiometric amount required for the conversion of residual oxygen to a mixture of carbon dioxide and moisture.

Steel samples heat treated in accord with this procedure were found to have a uniform, tightly packed oxide layer on the surface. Thus the introduction of non-cryogenically produced nitrogen pre-mixed with 1.4 times the stoichiometric amount of propane into a continuous heat treating furnace through a modified porous diffuser located in the heating zone would result in an acceptable process for controlled oxide annealing steel at 1,000° C.

EXAMPLE 4-20

The carbon steel annealing experiment described in Example 4-19 was repeated using the same furnace, temperature, samples, flow rate and composition of feed gas, type and location of gas feeding device, and annealing procedure with the exception of using 0.40% propane instead of 0.28%, as shown in Table 4. The amount of propane used in this example was 2.0 times the stoichiometric amount required for the conversion of residual oxygen to a mixture of carbon dioxide and moisture.

Steel samples heat treated in accord with this procedure were found to have a uniformly bright, oxide-free surface. Thus the introduction of non-cryogenically produced nitrogen into the heating zone through a modified porous diffuser at 1,000° C. would result in uniform bright, oxide-free samples provided that the amount of propane or any other hydrocarbon used is more than the stoichiometric amount required for the complete conversion of residual oxygen to a mixture of carbon dioxide and moisture, that the amount is high enough to yield $pCO/pCO_2$ greater than 2.5 and $pH_2/pH_2O$ greater than 1.5 both in the heating and cooling zones, and that the residual oxygen level in both the heating and cooling zones is less than 10 ppm.

EXAMPLE 4-21

The carbon steel annealing experiment described in Example 4-20 was repeated using the same furnace, temperature, samples, flow rate and composition of feed gas, type and location of gas feeding device, and annealing procedure with the exception of using 0.55% propane instead of 0.40%, as shown in Table 4. The amount of propane used in this example was 2.75 times the stoichiometric amount required for the conversion of residual oxygen to a mixture of carbon dioxide and moisture.

Steel samples heat treated in accord with this procedure were found to have a uniformly bright, oxide-free surface. Thus the introduction of non-cryogenically produced nitrogen into the heating zone through a modified porous diffuser at 1,000° C. would result in uniform bright, oxide-free samples provided that the amount of propane or any other hydrocarbon used is more than the stoichiometric amount required for the complete conversion of residual oxygen to a mixture of carbon dioxide and moisture, that the amount is high enough to yield $pCO/pCO_2$ greater than 2.5 and $pH_2/pH_2O$ greater than 1.5 both in the heating and cooling zones, and that the residual oxygen level in both the heating and cooling zones is less than 10 ppm.

EXAMPLE 4-22

The carbon steel annealing experiment described in Example 4-1 was repeated using the same furnace, samples, flow rate and composition of feed gas, type and location of gas feeding device, and annealing procedure with the exception of using 950° C. temperature instead of 1,100° C., as shown in Table 4. The amount of propane used in this example was 2.0 times the stoichiometric amount required for the conversion of residual oxygen to a mixture of carbon dioxide and moisture.

Steel samples heat treated in accord with this procedure were found to have a uniform, tightly packed oxide layer on the surface. The residual oxygen present in the feed nitrogen was converted in the heating and cooling zones to a mixture of carbon dioxide, carbon monoxide, and moisture, as shown In Table 4. The presence of $pH_2/pH_2O$ ratio close to 1.6 both in the heating and cooling zones and approximately 11 ppm oxygen in the cooling zone resulted in oxidizing the samples (see Table 4).

Thus the introduction of non-cryogenically produced nitrogen pre-mixed with 2.0 times the stoichiometric amount of propane into a continuous heat treating furnace through a modified porous diffuser located in the heating zone would result in an acceptable process for controlled oxide annealing steel at 950° C.

EXAMPLE 4-23

The carbon steel annealing experiment described in Example 4-22 was repeated using the same furnace, temperature, samples, flow rate and composition of feed gas, type and location of gas feeding device, and annealing procedure with the exception of using 0.25% propane instead of 0.20%, as shown in Table 4. The amount of propane used in this example was 2.5 times the stoichiometric amount required for the conversion of residual oxygen to a mixture of carbon dioxide and moisture.

Steel samples heat treated in accord with this procedure were found to have a mixture of bright and oxidized finish on the surface. The residual oxygen present in the feed nitrogen was converted in the heating and cooling zones to a mixture of carbon dioxide, carbon monoxide, and moisture, as shown in Table 4. The presence of approximately 12 ppm oxygen in the cooling zone resulted in partially oxidizing the samples (see Table 4).

Thus the introduction of non-cryogenically produced nitrogen pre-mixed with 2.5 times the stoichiometric amount of propane into a continuous heat treating furnace through a modified porous diffuser located in the heating zone would not result in an acceptable process for oxide or bright annealing steel at 950° C.

EXAMPLE 4-24

The carbon steel annealing experiment described in Example 4-22 was repeated using the same furnace, temperature, samples, flow rate and composition of feed gas, type and location of gas feeding device, and annealing procedure with the exception of using 0.32% propane instead of 0.20%, as shown in Table 4. The amount of propane used in this example was 3.2 times the stoichiometric amount required for the conversion of residual oxygen to a mixture of carbon dioxide and moisture.

Steel samples heat treated in accord with this procedure were found to have a bright, oxide-free surface finish. The residual oxygen present in the feed nitrogen was converted in the heating and cooling zones to a mixture of carbon monoxide and moisture, as shown in Table 4. The presence of high $pCO/pCO_2$ ($>2.4$) and $pH_2/pH_2O$ ($>1.6$) ratios in both the heating and cooling zones resulted in reducing the surface of the samples.

This example showed that the introduction of non-cryogenically produced nitrogen into the heating zone through a modified porous diffuser at 950° C. would result in uniform bright, oxide-free samples provided that the amount of propane or any other hydrocarbon used is more than the stoichiometric amount required for the complete conversion of residual oxygen to a mixture of carbon dioxide and moisture, that the amount is high enough to yield $pCO/pCO_2$ greater than 2.4 and $pH_2/pH_2O$ greater than 1.6 both in the heating and cooling zones, and that the residual oxygen level in both the heating and cooling zones is close to 10 ppm.

Examination of incoming material showed neither carburization or decarburization while the steel sample heat treated in the non-cryogenically produced nitrogen atmosphere pre-mixed with propane in this example produced decarburization of approximately 0.0048 inches.

EXAMPLE 4-25

The carbon steel annealing experiment described in Example 4-24 was repeated using the same furnace, temperature, samples, flow rate of feed gas, type and location of gas feeding device, amount of propane, and annealing procedure with the exception of using a non-cryogenically produced nitrogen containing 99.25% $N_2$ and 0.75% $O_2$. The amount of propane used in this example was approximately 2.1 times the stoichiometric amount required for the conversion of residual oxygen to a mixture of carbon dioxide and moisture.

Steel samples heat treated in accord with this procedure were found to have a mixture of bright and oxidized finish on the surface. The residual oxygen present in the feed nitrogen was converted in the heating and cooling zones to a mixture of carbon dioxide, carbon monoxide, and moisture, as shown in Table 4. The presence of approximately 15 ppm oxygen in the cooling zone resulted in partially oxidizing the samples (see Table 4).

Thus the introduction of non-cryogenically produced nitrogen pre-mixed with approximately 2.1 times the stoichiometric amount of propane into a continuous heat treating furnace through a modified porous diffuser located in the heating zone would not result in an acceptable process for oxide or bright annealing steel at 950° C.

EXAMPLE 4-26

The carbon steel annealing experiment described in Example 4-25 was repeated using the same furnace, temperature, samples, flow rate and composition of feed gas, type and location of gas feeding device, and annealing procedure with the exception of using 0.55% propane instead of 0.32%, as shown in Table 4. The amount of propane used in this example was approximately 3.7 times the stoichiometric amount required for the conversion of residual oxygen to a mixture of carbon dioxide and moisture.

Steel samples heat treated in accord with this procedure were found to have a bright surface finish. The surface of the samples appeared to have slight straw coloration, making them marginally acceptable. The residual oxygen present in the feed nitrogen was converted in the heating and cooling zones to a mixture of carbon monoxide and moisture, as shown in Table 4. The presence of high $pCO/pCO_2$ ($>2.4$) and $pH_2/pH_2O$ ($>1.6$) ratios in both the heating and cooling zones resulted in reducing the surface of the samples. However, the presence of approximately 12 ppm of oxygen in the cooling zone resulted in slight straw color on the surface of the samples.

This example showed that the introduction of non-cryogenically produced nitrogen containing 0.75% oxygen into the heating zone through a modified porous diffuser at 950° C. would result in marginally acceptable bright samples.

EXAMPLE 4-27

The carbon steel annealing experiment described in Example 4-25 was repeated using the same furnace, temperature, samples, flow rate and composition of feed gas, type and location of gas feeding device, and annealing procedure with the exception of using 0.63% propane instead of 0.32%, as shown in Table 4. The amount of propane used in this example was approximately 4.2 times the stoichiometric amount required for the conversion of residual oxygen to a mixture of carbon dioxide and moisture.

Steel samples heat treated in accord with this procedure were found to have a bright surface finish. The surface of the samples appeared to have slight straw coloration, making them marginally acceptable. The belt and the furnace showed signs of sooting, indicating that it would not be desirable to use such a high flow rate of propane.

This example showed that the introduction of non-cryogenically produced nitrogen containing 0.75% oxygen along with 0.63% propane into the heating zone through a modified porous diffuser at 950° C. would not result in acceptable process for bright annealing samples.

EXAMPLE 4-28

The carbon steel annealing experiment described in Example 4-1 was repeated using the same furnace, samples, flow rate and composition of feed gas, type and location of gas feeding device, and annealing procedure with the exception of using 900° C. temperature instead of 1,100° C., as shown in Table 4. The amount of propane used in this example was 2.0 times the stoichiometric amount required for the conversion of residual oxygen to a mixture of carbon dioxide and moisture.

Steel samples heat treated in accord with this procedure were found to have a mixture of bright and oxidized finish on the surface. The residual oxygen present in the feed nitrogen was converted in the heating and cooling zones to a mixture of carbon dioxide, carbon monoxide, and moisture, as shown in Table 4. The presence of approximately 18 ppm oxygen in the cooling zone resulted in partially oxidizing the samples (see Table 4).

Thus the introduction of non-cryogenically produced nitrogen pre-mixed with approximately 2.0 times the stoichiometric amount of propane into a continuous heat treating furnace through a modified porous diffuser located in the heating zone would not result in an acceptable process for oxide or bright annealing steel at 900° C.

EXAMPLE 4-29

The carbon steel annealing experiment described in Example 4-28 was repeated using the same furnace, temperature, samples, flow rate and composition of feed gas, type and location of gas feeding device, and annealing procedure with the exception of using 0.28% propane instead of 0.20%, as shown in Table 4. The amount of propane used in this example was 2.8 times the stoichiometric amount required for the conversion of residual oxygen to a mixture of carbon dioxide and moisture.

Steel samples heat treated in accord with this procedure were found to have a mixture of bright and oxidized finish on the surface. The residual oxygen present in the feed nitrogen was converted in the heating and cooling zones to a mixture of carbon monoxide and moisture, as shown in Table 4. The presence of more than 10 ppm of oxygen in the heating and cooling zones resulted in partially oxidizing the samples (see Table 4). Additionally, some sooting was seen on the belt, indicating that it would not be desirable to use equal to or more than 0.28% propane in the furnace at 900° C.

Thus the introduction of non-cryogenically produced nitrogen pre-mixed with 2.8 times the stoichiometric amount of propane into a continuous heat treating furnace through a modified porous diffuser located in the heating zone would not result in an acceptable process for oxide or bright annealing steel at 950° C.

DISCUSSION

The Examples 4-1 to 4-6 showed that non-cryogenically produced nitrogen could be used to bright anneal steel at 1,100° C. temperature provided that about 1.5 times the stoichiometric amount of propane required for the conversion of residual oxygen to a mixture of carbon dioxide and moisture was used and that a modified diffuser was used to introduce the gaseous feed mixture in the heating zone of the furnace. The amount of propane required for bright annealing steel was considerably lower than that of natural gas probably due to higher reactivity of propane that natural gas (the auto ignition temperature of propane is 468° C. compared to 556° C. for natural gas). Examples 4-7 to 4-24 showed that non-cryogenically produced nitrogen could be used to bright anneal steel at 1,050° C., 1,000° C., and 950° C. temperatures provided that about 1.7, 1.9, and 3.2 times, respectively, the stoichiometric amount of propane required for the conversion of residual oxygen to a mixture of carbon dioxide and moisture was used. The above examples showed that the absolute amount of propane required for bright annealing steel increased with the increase in the level of residual oxygen in the feed nitrogen. Additionally, the absolute amount of propane required for bright annealing steel decreased with an increase in the heat treatment temperature.

Figure 9:
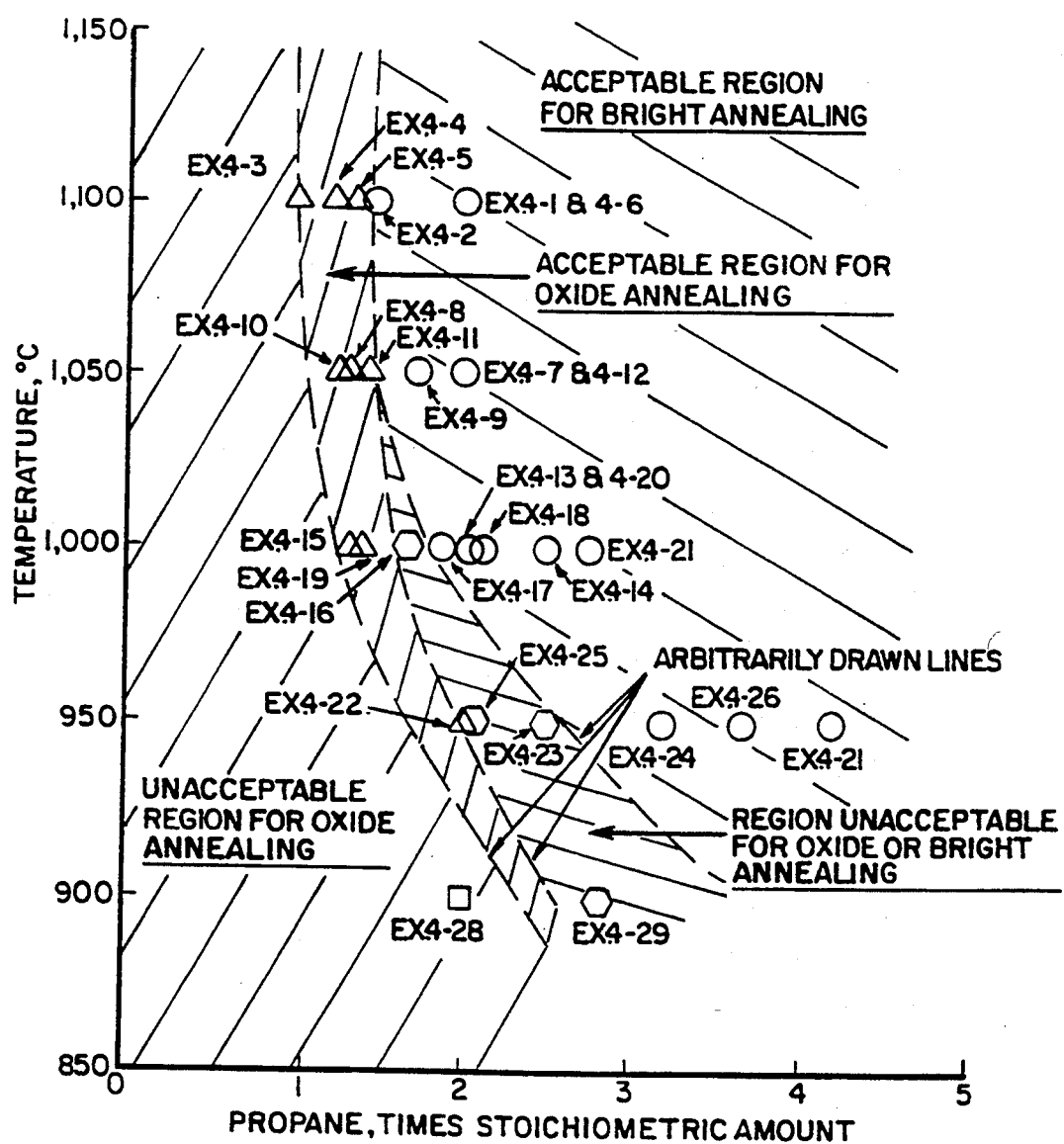
FIG. 9 is a plot of annealing temperature against propane requirement for annealing carbon steel according to the invention.

The above Examples showed that a non-cryogenically produced nitrogen can be used to oxide anneal steel at 1,100°, 1,050°, 1,000°, and 950° C. provided that the amount of propane added to the feed nitrogen is less than 1.5, 1.7, 1.9, and 3.2 times, respectively, the stoichiometric amount required for the conversion of residual oxygen present in the feed nitrogen to a mixture of carbon dioxide and moisture. The operating regions for oxide and bright, oxide-free annealing of low carbon steels using a mixture of non-cryogenically produced nitrogen and propane are shown in FIG. 9.

A number of experiments were carried out for brazing bronze to carbon steel using a mixture of non-cryogenically produced nitrogen and natural gas. The results of these experiments are discussed in detail below.

TABLE 5

|  | Example 5-1 | Example 5-2 | Example 5-3 |
|---|---|---|---|
| Heat Treatment Temperature, °C. | 1,000 | 1,000 | 1,000 |
| Flow Rate of Feed Gas, SCFH | 350 | 350 | 350 |
| Feed Gas Location | Heating Zone (Location 76) | Heating Zone (Location 76) | Heating Zone (Location 76) |
| Type of Feed Device | Modified Porous Diffuser (FIG. 3C) | Modified Porous Diffuser (FIG. 3C) | Modified Porous Diffuser (FIG. 3C) |
| Feed Gas Composition |  |  |  |
| Nitrogen, % | 99.70 | 99.70 | 99.60 |
| Oxygen, % | 0.30 | 0.30 | 0.40 |
| Natural Gas* (Methane), % | 2.00 | 2.00 | 2.50 |
| Heating Zone Atmosphere Composition |  |  |  |
| Oxygen, ppm | <3 | <3 | <3 |
| Carbon Monoxide, % | 0.50 | 0.50 | 0.70 |
| Carbon Dioxide, % | 0.00 | 0.00 | 0.01 |
| Hydrogen, % | 2.00 | 2.00 | 2.50 |
| Methane, % | 0.70 | 0.73 | 0.80 |
| Dew Point, °C. | −57.7 | −57.5 | −57.3 |
| Cooling Zone Atmosphere Composition |  |  |  |
| Oxygen, ppm | <9 | <9 | ~10 |
| Carbon Monoxide, % | 0.45 | 0.50 | 0.55 |
| Carbon Dioxide, % | 0.00 | 0.00 | 0.01 |
| Hydrogen, % | 2.00 | 2.00 | 2.50 |
| Methane, % | 0.70 | 0.75 | 0.94 |
| Dew Point, °C. | −38.4 | −37.9 | −36.7 |

TABLE 5-continued

|  | Example 5-1 | Example 5-2 | Example 5-3 |
| --- | --- | --- | --- |
| Quality of Brazed Samples | Good | Good | Good |

*Natural gas was mixed with nitrogen and added as a percent of total non-cryogenically produced nitrogen.

EXAMPLE 5-1

The heat treating procedure described in Example 2-17A was followed using the same furnace, flow rate and composition of feed gas, temperature, and type and location of gas feeding device for brazing bronze to carbon steel using copper pre-forms. The non-cryogenically produced nitrogen used in this example contained 99.70% nitrogen and 0.30% residual oxygen, as shown in Table 5. The amount of natural gas added was 2.0%. it was approximately 13.3 times the stoichiometric amount required for the conversion of residual oxygen to a mixture of carbon dioxide and moisture.

The carbon steel and bronze parts were brazed successfully with good braze flow in this example. The PSA $N_2$-natural gas atmosphere provided optimum braze spreading and fillet formation. Additionally, no void formation was observed at the braze joint. Finally, the brazed carbon steel and bronze part had a bright, oxide-free surface finish.

This example showed that non-cryogenically produced nitrogen atmosphere pre-mixed with a hydrocarbon gas can be used for brazing bronze to carbon steel.

EXAMPLE 5-2

The brazing experiment described in Example 5-2 was repeated using the same furnace, flow rate and composition of feed gas, temperature, and type and location of gas feeding device, as shown in Table 5.

The carbon steel and bronze parts were brazed successfully with good braze flow in this example. The PSA $N_2$-natural gas atmosphere provided optimum braze spreading and fillet formation. Additionally, no void formation was observed at the braze joint. Finally, the brazed carbon steel and bronze part had a bright, oxide-free surface finish.

This example once again showed that non-cryogenically produced nitrogen atmosphere pre-mixed with a hydrocarbon gas can be used for brazing bronze to carbon steel.

EXAMPLE 5-3

The brazing experiment described in Example 5-2 was repeated using the same furnace, flow rate of feed gas, temperature, and type and location of gas feeding device with the exceptions of using non-cryogenically produced nitrogen containing 99.60% nitrogen and 0.40% oxygen and adding 2.5% natural gas, as shown in Table 5. The amount of natural gas added was 12.5 times the stoichiometric amount required for the conversion of residual oxygen to a mixture of carbon dioxide and moisture.

The carbon steel and bronze parts were brazed successfully with good braze flow in this example. The PSA $N_2$-natural gas atmosphere provided optimum braze spreading and fillet formation. Additionally, no void formation was observed at the braze joint. Finally, the brazed carbon steel and bronze part had a bright, oxide-free surface finish.

This example showed that non-cryogenically produced nitrogen atmosphere pre-mixed with a hydrocarbon gas can be used for brazing bronze to carbon steel.

Having thus described our invention what is desired to be secured by Letters Patent of the United States is set forth in the appended claims.

We claim:

1. A method of generating an in-situ atmosphere inside furnace used for performing brazing of metals, sealing of glass to metals, sintering metal and ceramic powders, or non-ferrous metal and alloy annealing processes wherein said process comprises the steps of:
   heating said furnace to a temperature above 700° C.;
   injecting into a hot zone of the said furnace gaseous nitrogen generated by a non-cryogenic means containing up to 5% by volume oxygen together with a hydrocarbon gas, said hydrocarbon gas injected into said furnace with a flow rate varying from above about 1.5 times the stoichiometric amount required for a complete conversion of oxygen to a mixture of moisture and carbon dioxide, in a manner to permit said reaction of oxygen and said hydrocarbon gas to be essentially complete prior to said mixture contacting parts being subjected to a given process; and
   exposing said parts to said temperature and said atmosphere for a time sufficient to complete said process.

2. A method according to claim 1 wherein said residual oxygen is converted to a mixture of moisture and carbon monoxide.

3. A method according to claim 1 wherein said residual oxygen is converted to carbon dioxide, moisture, carbon monoxide or mixtures thereof.

4. A method according to claim 1 wherein nitrogen generated by non-cryogenic means contained up to about 1.0% by volume oxygen.

5. A method according to claim 1 wherein said furnace is a continuous furnace with integrated heating and cooling zones.

6. A method according to claim 1 wherein said furnace is a continuous furnace with a heating zone and a quench cooling zone.

7. A method according to claim 1 wherein said hydrocarbon gas is selected from alkanes such as methane, ethane, propane, and butane; alkenes such as ethylene, propylene, and butene; alcohols such as methanol, ethanol, and propanol; ethers such as dimethyl ether, diethyl ether, and methyl ethyl ether; and commercial feedstocks such as natural gas, petroleum gas, cooking gas, coke oven gas, town gas, exothermic gas, and endothermic gas.

8. A method according to claim 1 wherein said furnace is heated to a temperature of between 700° C. and 1,250° C.

9. A method according to claim 7 wherein said hydrocarbon is natural gas or methane injected in an amount greater than 5.0 times to above about 40.0 times the stoichiometric amount required for the conversion of residual oxygen to a mixture of moisture and carbon dioxide.

10. A method according to claim 7 wherein said hydrocarbon is propane injected in an amount greater than 1.5 times to above 3.2 times the stoichiometric amount required for the conversion of residual oxygen to a mixture of moisture and carbon dioxide.

* * * * *